(12) United States Patent
Shimizu

(10) Patent No.: US 9,445,029 B2
(45) Date of Patent: Sep. 13, 2016

(54) SOLID-STATE IMAGING APPARATUS WITH PLURAL COLUMN CIRCUITS ARRANGED SEPARATELY IN UPPER AND LOWER POSITIONS AND DRIVING METHOD THEREFOR

(71) Applicant: CANON KABUSHIKI KAISHA, Tokyo (JP)

(72) Inventor: Shinichiro Shimizu, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/573,130

(22) Filed: Dec. 17, 2014

(65) Prior Publication Data

US 2015/0189210 A1 Jul. 2, 2015

(30) Foreign Application Priority Data

Dec. 27, 2013 (JP) ................. 2013-273334

(51) Int. Cl.
| | |
|---|---|
| *H04N 3/14* | (2006.01) |
| *H04N 5/335* | (2011.01) |
| *H04N 5/217* | (2011.01) |
| *H04N 5/378* | (2011.01) |
| *H04N 5/243* | (2006.01) |
| *H04N 5/343* | (2011.01) |
| *H04N 5/355* | (2011.01) |

(52) U.S. Cl.
CPC ............. *H04N 5/378* (2013.01); *H04N 5/243* (2013.01); *H04N 5/343* (2013.01); *H04N 5/35572* (2013.01)

(58) Field of Classification Search
CPC .... H04N 5/378; H04N 3/1568; H04N 5/343; H04N 5/355; H04N 5/35563; H04N 5/35581; H04N 5/3658
USPC ........................................ 348/300–324, 241
See application file for complete search history.

(56) References Cited

U.S. PATENT DOCUMENTS

| | | | |
|---|---|---|---|
| 8,507,870 B2 | 8/2013 | Arishima et al. | |
| 8,530,989 B2 | 9/2013 | Kikuchi et al. | |
| 8,553,119 B2 | 10/2013 | Hashimoto et al. | |
| 8,687,246 B2 | 4/2014 | Fujimura et al. | |
| 8,710,610 B2 | 4/2014 | Kono et al. | |
| 8,836,833 B2 | 9/2014 | Yamashita et al. | |
| 2004/0135910 A1* | 7/2004 | Nam | H04N 9/045 348/308 |
| 2009/0322903 A1* | 12/2009 | Hashimoto | H04N 5/378 348/229.1 |
| 2010/0110254 A1* | 5/2010 | Mo | H04N 5/378 348/308 |
| 2010/0194948 A1* | 8/2010 | Murakami | H04N 3/1568 348/302 |

(Continued)

FOREIGN PATENT DOCUMENTS

| | | |
|---|---|---|
| JP | 2006-050403 | 2/2006 |
| JP | 2010-016416 | 1/2010 |

*Primary Examiner* — Chia-Wei A Chen
(74) *Attorney, Agent, or Firm* — Fitzpatrick, Cella, Harper & Scinto

(57) ABSTRACT

A solid-state imaging apparatus of this invention includes a plurality of pixels arranged in a matrix and configured to generate signals by photoelectric conversion, a plurality of signal lines each provided on each column of the pixels, and a plurality of column circuits each provided for each of the signal lines. It is possible to select one of a first readout operation of simultaneously processing the signals of the pixels on a plurality of rows by the plurality of column circuits and a second readout operation of simultaneously processing the signal of the same pixel by different gains by the plurality of column circuits.

16 Claims, 20 Drawing Sheets

(56) References Cited

U.S. PATENT DOCUMENTS

| | | | |
|---|---|---|---|
| 2011/0062314 A1* | 3/2011 | Doege | H03M 1/124 250/214 R |
| 2012/0049042 A1* | 3/2012 | Lim | H04N 5/3575 250/208.1 |
| 2012/0104232 A1* | 5/2012 | Hwang | H04N 5/23241 250/208.1 |
| 2012/0127354 A1* | 5/2012 | Cieslinski | H04N 5/343 348/300 |
| 2012/0229666 A1* | 9/2012 | Hagihara | H04N 5/378 348/222.1 |
| 2013/0021510 A1* | 1/2013 | Sambonsugi | H04N 5/355 348/302 |
| 2013/0033631 A1* | 2/2013 | Mabuchi | H04N 5/37452 348/302 |
| 2013/0063643 A1* | 3/2013 | Yamashita | H04N 5/376 348/311 |
| 2013/0099099 A1* | 4/2013 | Anaxagoras | H01L 27/14601 250/208.1 |
| 2013/0113966 A1* | 5/2013 | Arishima | H04N 5/378 348/301 |
| 2013/0119234 A1* | 5/2013 | Lee | H01L 31/103 250/208.1 |
| 2015/0070554 A1 | 3/2015 | Shimizu et al. | |
| 2015/0130971 A1* | 5/2015 | Oike | H03M 1/186 348/241 |
| 2015/0163430 A1* | 6/2015 | Kanemitsu | H04N 5/378 348/308 |

* cited by examiner

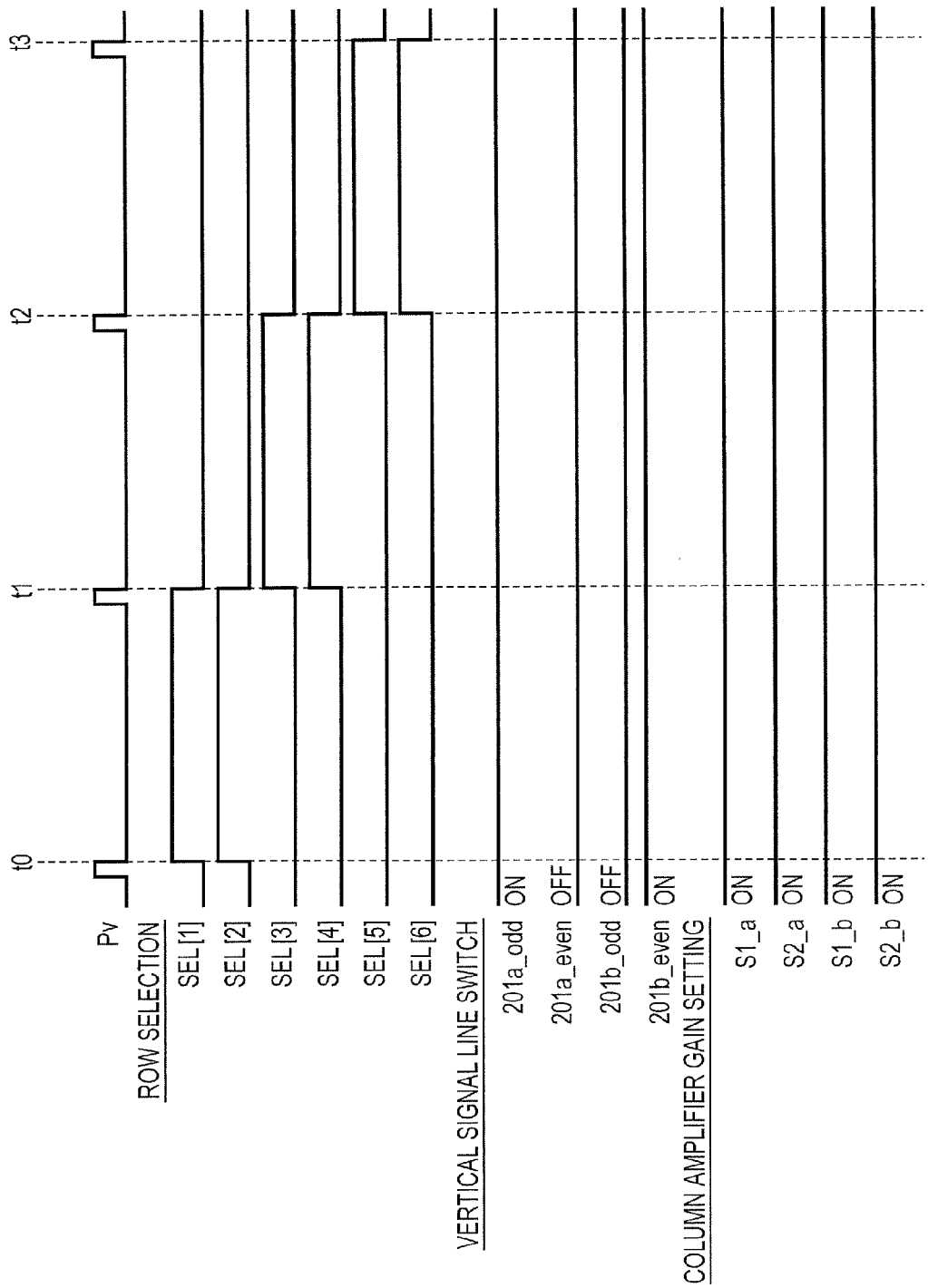

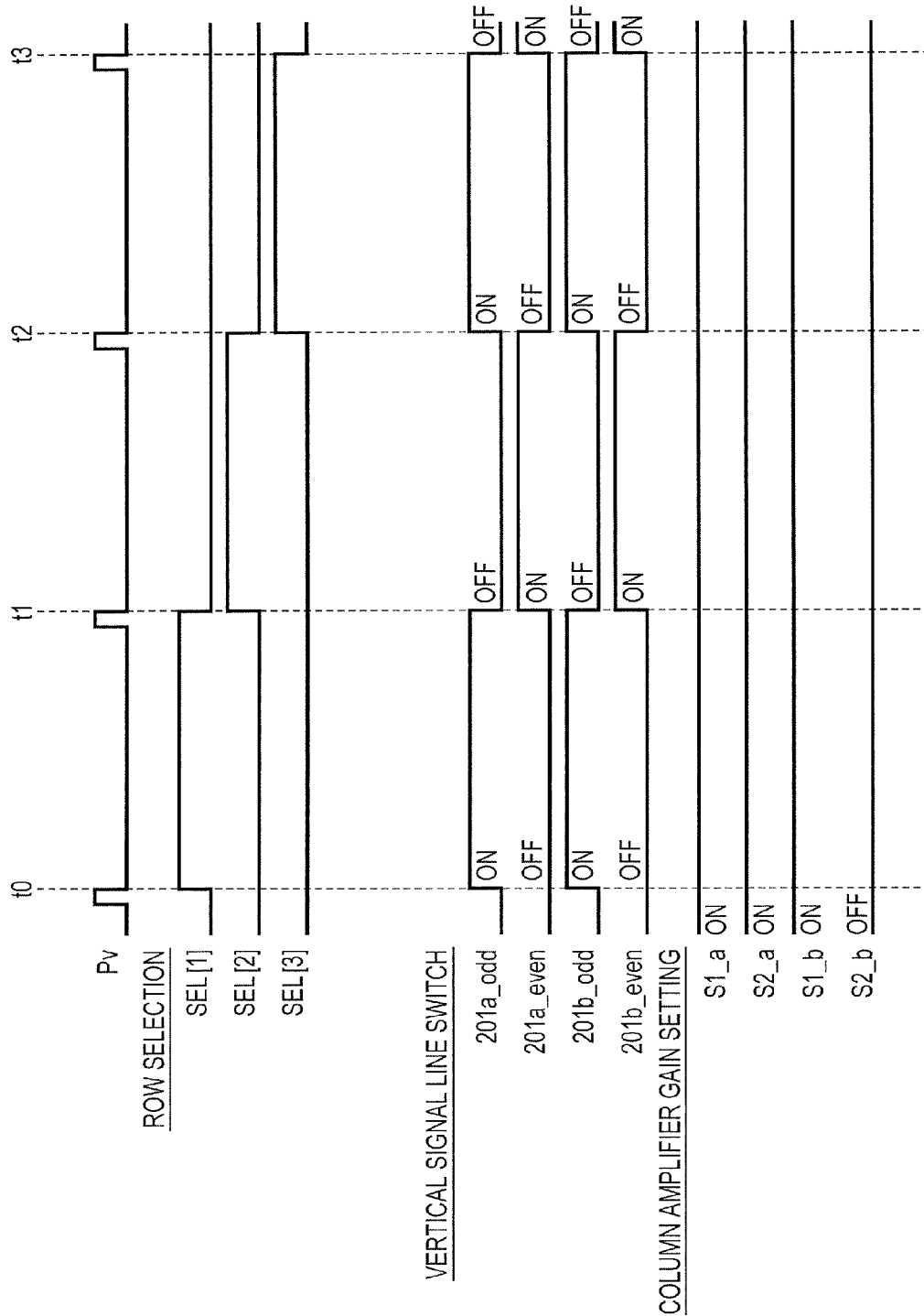

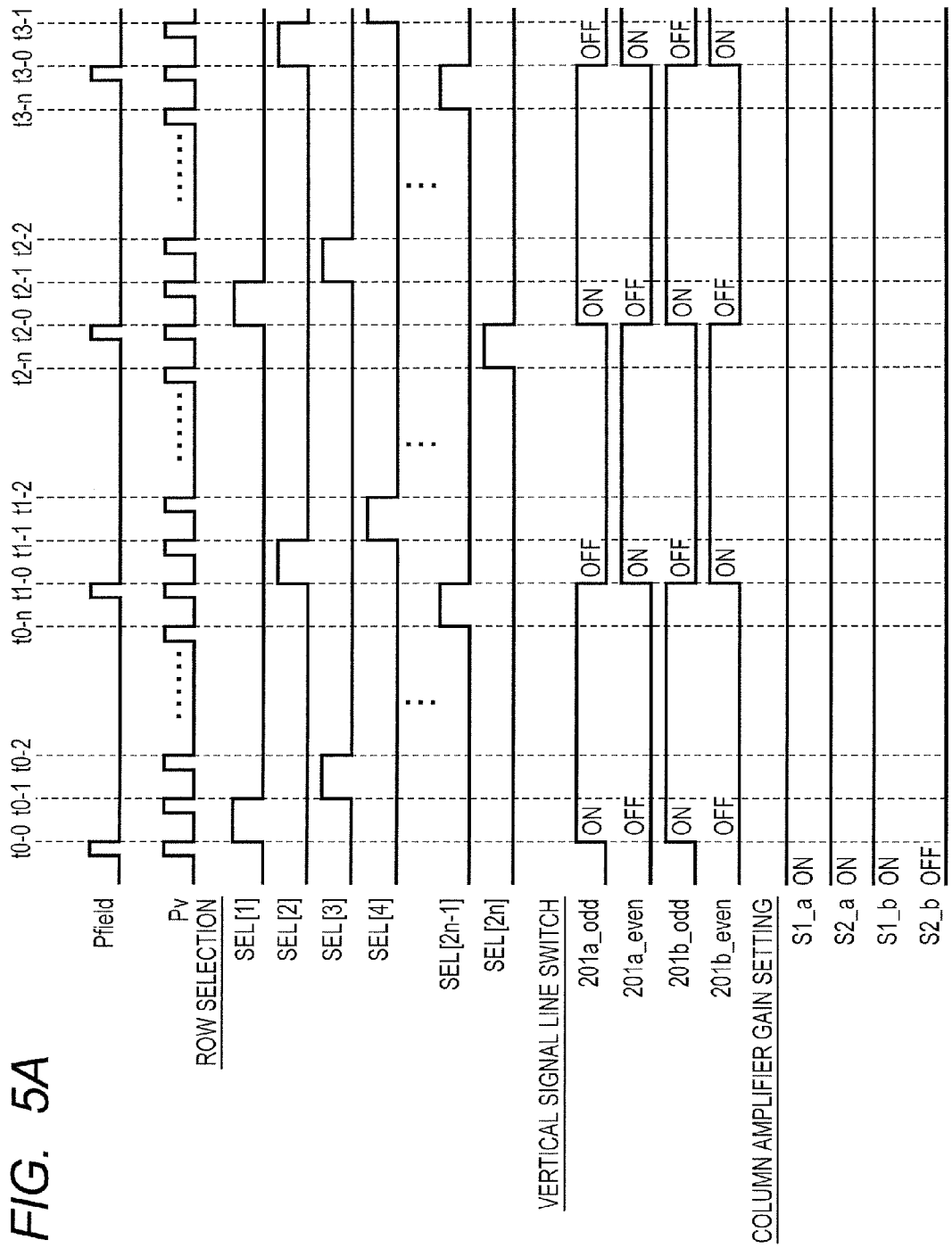

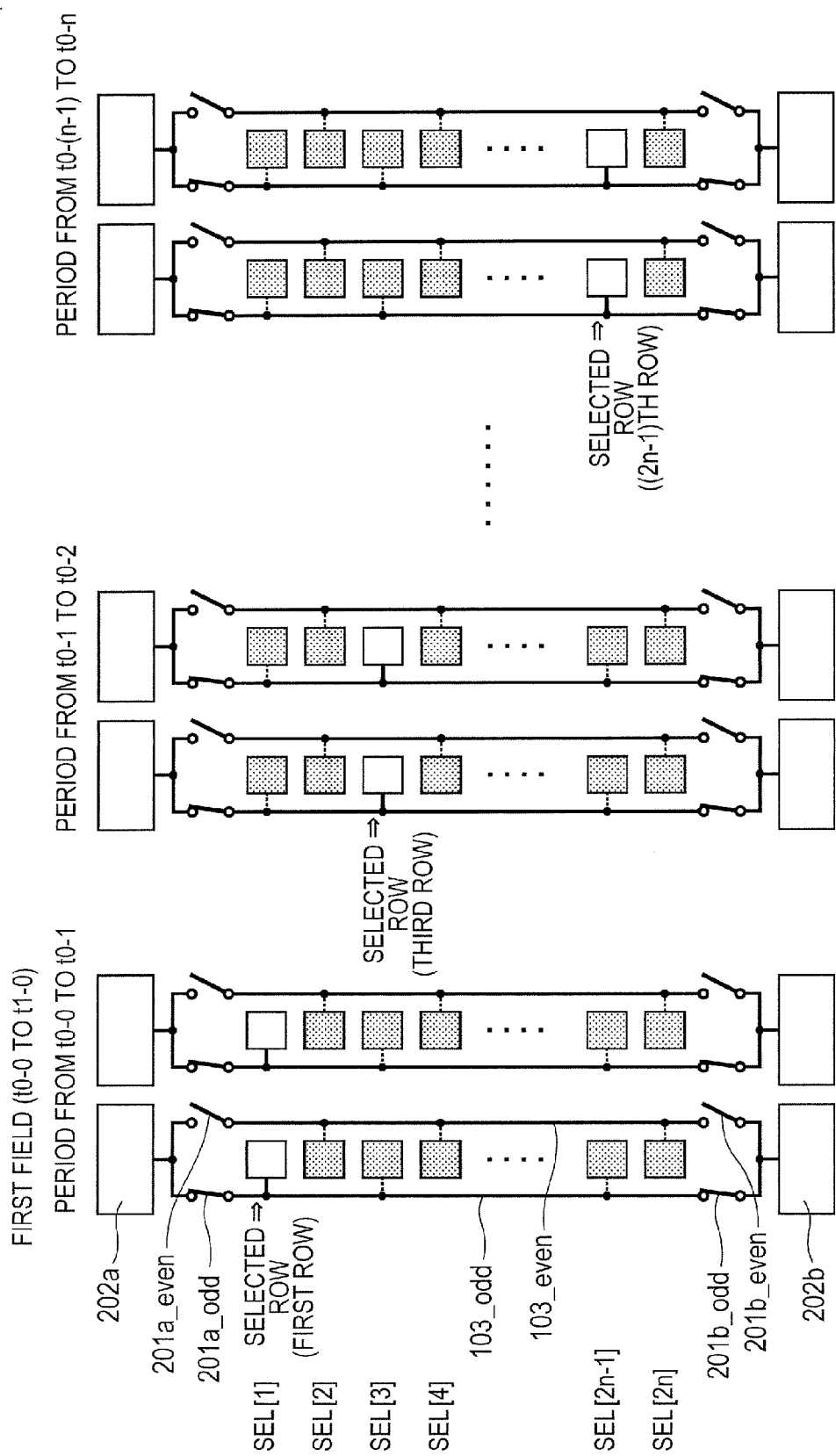

US 9,445,029 B2

SOLID-STATE IMAGING APPARATUS WITH PLURAL COLUMN CIRCUITS ARRANGED SEPARATELY IN UPPER AND LOWER POSITIONS AND DRIVING METHOD THEREFOR

BACKGROUND OF THE INVENTION

1. Field of the Invention

The present invention relates to a solid-state imaging apparatus including a plurality of photoelectric conversion elements for converting incident light into an electrical signal, and a driving method for the solid-state imaging apparatus.

2. Description of the Related Art

There is a tendency to increase the number of pixels of a solid-state imaging apparatus, and it is thus required to increase the signal readout speed. As a technique of increasing the speed, Japanese Patent Application Laid-Open No. 2006-050403 discloses an arrangement including a plurality of signal readout lines for a pixel column.

Along with an increase in number of pixels, a pixel size decreases, and it is necessary to maintain the S/N ratio and dynamic range. Japanese Patent Application Laid-Open No. 2010-016416 discloses a technique of amplifying the signal of one pixel by a plurality of gains, reducing output noise by multiplying an amplified signal with a magnification smaller than 1 according to the magnitude of the signal, and widening the dynamic range.

SUMMARY OF THE INVENTION

The arrangements described in the above literatures separately increase the signal readout speed and widens the dynamic range, and are not implemented by one apparatus.

According to the present invention, there is provided a solid-state imaging apparatus comprising a plurality of pixels arranged in a matrix and configured to generate signals by photoelectric conversion, a plurality of signal lines each provided on each column of the pixels, and a plurality of column circuits each provided for each of the signal lines, wherein one of a first readout operation of simultaneously processing the signals of the pixels on a plurality of rows by the plurality of column circuits and a second readout operation of simultaneously processing the signal of the same pixel by different gains by the plurality of column circuits is selectable.

Further features of the present invention will become apparent from the following description of exemplary embodiments with reference to the attached drawings.

BRIEF DESCRIPTION OF THE DRAWINGS

FIG. 3A is a timing chart in a high-speed readout mode according to the first embodiment.

FIG. 4A is a timing chart in a wide dynamic range mode according to the first embodiment.

FIG. 5A is a timing chart in the wide dynamic range mode according to the second embodiment.

FIG. 5B is a diagram showing transition of the electrical connection state of each switch in the wide dynamic range mode according to the second embodiment.

DESCRIPTION OF THE EMBODIMENTS

Preferred embodiments of the present invention will now be described in detail in accordance with the accompanying drawings.

First Embodiment

A solid-state imaging apparatus according to the first embodiment of the present invention will be described below with reference to FIGS. 1 to 4C. The solid-state imaging apparatus according to this embodiment outputs an analog signal, and switches a gain for each horizontal scanning period.

Figure 1:
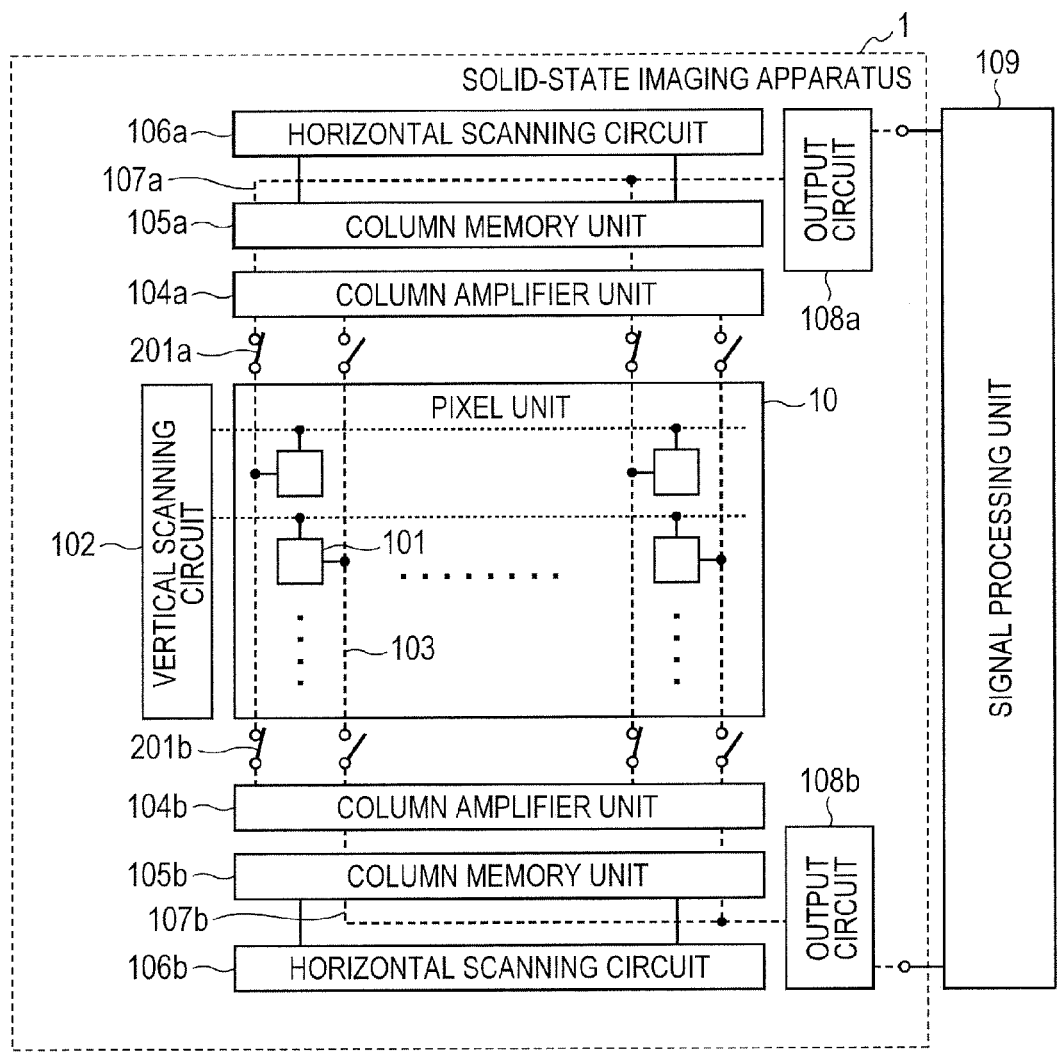
FIG. 1 is a diagram showing the schematic arrangement of a solid-state imaging apparatus according to an embodiment.

FIG. 1 shows the schematic arrangement of a solid-state imaging apparatus 1 according to the first embodiment. The solid-state imaging apparatus 1 includes a pixel unit 10, a vertical scanning circuit 102, vertical signal lines 103, column amplifier units 104a and 104b, column memory units 105a and 105b, horizontal scanning circuits 106a and 106b, horizontal signal lines 107a and 107b, and output circuits 108a and 108b.

The pixel unit 10 comprises a plurality of pixels 101 which are two-dimensionally arranged in a matrix of m rows×n columns. Although not shown, each pixel 101 includes a photodiode serving as a photoelectric conversion element, a pixel output unit for outputting charges accumulated in the photodiode, and a pixel selection unit for selecting the pixel. The vertical scanning circuit 102 is electrically connected to the pixel selection unit of the pixel 101. When the vertical scanning circuit 102 selects the pixel 101, it outputs a pixel signal photoelectrically converted by the pixel 101 to the selected vertical signal line 103. In the specification and drawings, "vertical" and "horizontal" are referred to just for distinguishing two directions, and the vertical signal line can be referred to as a "signal line".

Each of a plurality of vertical signal lines 103 is provided on each pixel column, and can be electrically connected to the column amplifier unit 104a or 104b. A pixel signal is input to the column amplifier unit 104a or 104b via the vertical signal line 103. Each of the column amplifier units 104a and 104b includes a plurality of amplifier circuits each corresponding to each vertical signal line. Each of the column memory units 105a and 105b includes a sample and hold circuit and the like, and holds the pixel signal amplified by the corresponding one of the column amplifier units 104a and 104b. The horizontal scanning circuits 106a and 106b electrically connect the column memory units 105a and 105b to the horizontal signal lines 107a and 107b, and output the amplified pixel signals to the output circuits 108a and 108b, respectively. The signal output from each of the output circuits 108a and 108b is output to a signal processing unit 109. The signal processing unit 109 performs an analog/digital conversion of the input pixel signal, and performs signal processing such as gain processing, correction processing, and gamma processing for the digital conversion data, thereby saving the processed data as image data.

Figure 2A:
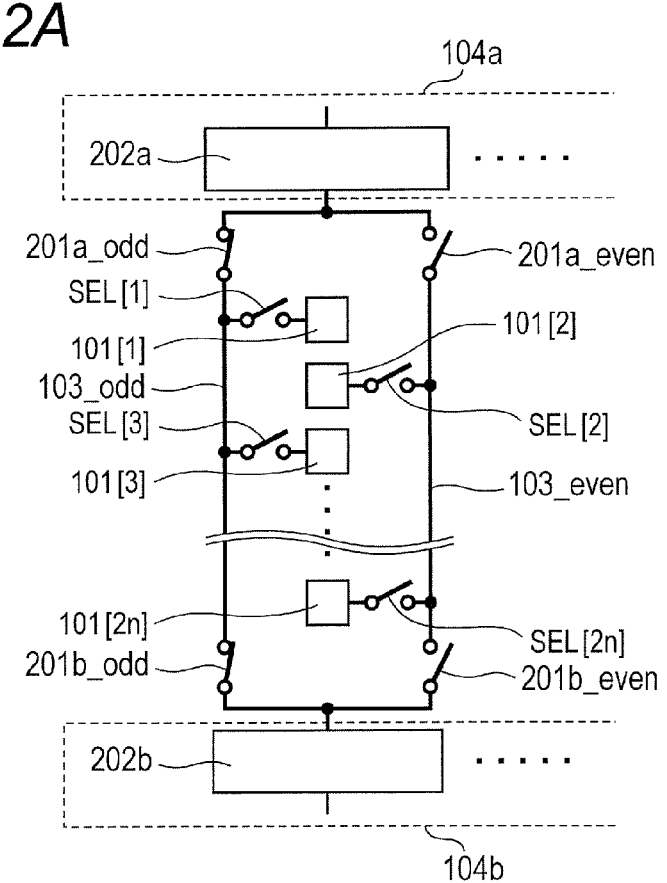
FIG. 2A is a diagram showing a pixel unit and a signal readout circuit for a column of the solid-state imaging apparatus according to the first embodiment.

FIG. 2A is a diagram showing the arrangement of the pixels 101, vertical signal lines 103, and column amplifier units 104 for a column. A pixel array in a column includes the pixels 101[1] to 101[2n] (n is an integer of one or more), and the vertical signal lines 103 include two vertical signal lines 103_odd and 103_even. The vertical signal line 103_odd is electrically connected to the pixels 101[2n−1] of odd rows via row selection switches SEL[2n−1], and the vertical signal line 103_even is electrically connected to the pixels 101[2n] of even rows via row selection switches SEL[2n].

The column amplifier unit 104a includes a plurality of column amplifier circuits 202a. Similarly, the column amplifier unit 104b includes a plurality of column amplifier circuits 202b. One end of the vertical signal line 103_odd is electrically connected to the column amplifier circuit 202a via a connection switch 201a odd. The other end of the vertical signal line 103_odd is electrically connected to the column amplifier circuit 202b via a connection switch 201b_odd. Similarly, one end of the vertical signal line 103_even is electrically connected to the column amplifier circuit 202a via a connection switch 201a even. The other end of the vertical signal line 103_even is electrically connected to the column amplifier circuit 202b via a connection switch 201b even. The row selection switches SEL[1] to SEL[2n] electrically connect the pixels 101 of the odd rows to the vertical signal line 103_odd. The pixels 101 of the even rows to the vertical signal line 103_even.

Figure 2B:
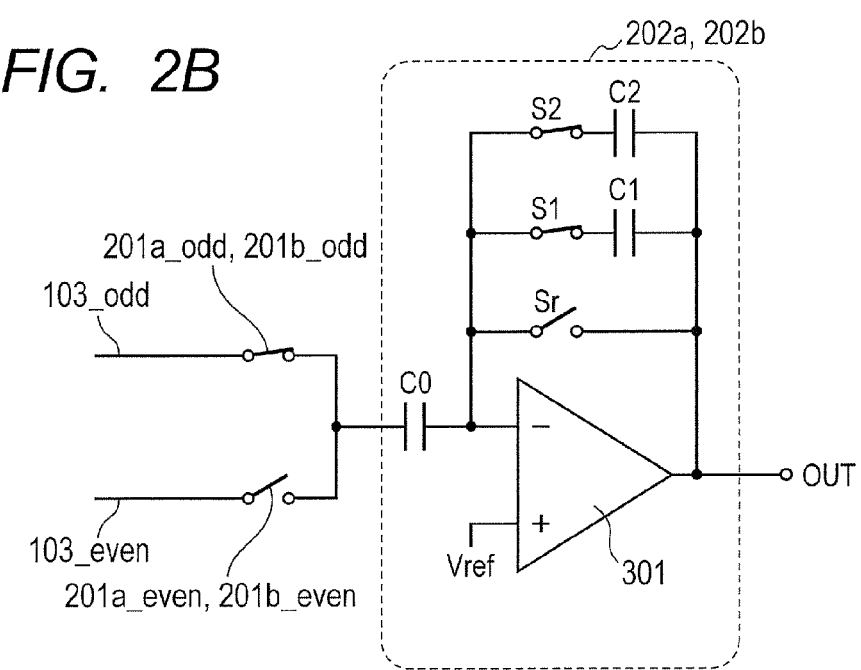
FIG. 2B is a diagram showing the arrangement of a column amplifier circuit according to the first embodiment.

FIG. 2B shows an analog amplifier circuit as an example of the column amplifier circuits 202a and 202b. Note that the column amplifier circuits 202a and 202b have the same arrangement, and have the same electrical connections with the vertical signal lines 103. Therefore, the column amplifier circuit 202a will be exemplified. The column amplifier circuit 202a includes a differential amplifier 301, an input capacitor C0, feedback capacitors C1 and C2, and switches S1, S2, and Sr. A reference voltage Vref is input to the non-inverting input node of the differential amplifier 301, and one terminal of the input capacitor C0 is electrically connected to the inverting input node of the differential amplifier 301. The other terminal of the input capacitor C0 is electrically connected to the vertical signal lines 103_odd and 103_even via the connection switches 201a odd and 201a even, respectively. The inverting input node and output node of the differential amplifier 301 are electrically connectable via the switch Sr, the switch S1 and feedback capacitor C1, or the switch S2 and feedback capacitor C2. Controlling the switches S1 and S2 can switch the gain of the column amplifier circuit 202a. For example, if the switches S1 and S2 are turned on, the gain of the column amplifier circuit 202a is C0/(C1+C2). If only the switch S1 is turned on, the gain of the column amplifier circuit 202a is C0/C1. If all the switches S1, S2, and Sr are turned on, the output node and the inverting input node of the differential amplifier 301 are short-circuited, thereby resetting the feedback capacitors C1 and C2.

In the solid-state imaging apparatus according to the first embodiment, electrical connections of the vertical signal line 103 and the column amplifier circuits 202a and 202b are switched by the connection switches 201a_odd, 201b_odd, 201a_even, and 201b_even. Furthermore, the solid-state imaging apparatus is driven by switching the gain of the column amplifier circuit 202, thereby switching between the high-speed readout mode (first readout operation) and the wide dynamic range mode (second readout operation). A driving method in each readout mode will be described with reference to a timing chart.

Figure 3B:
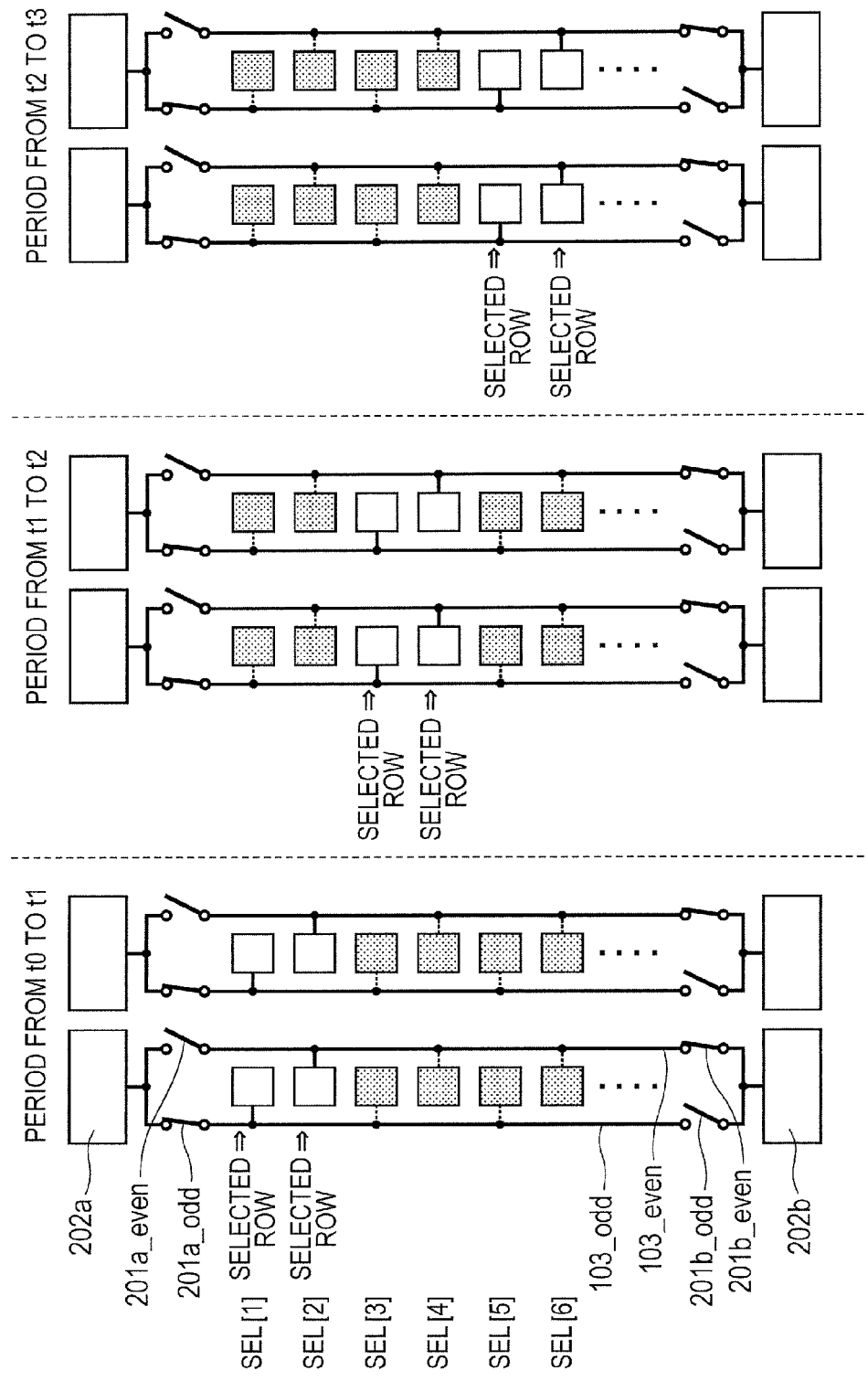
FIG. 3B is a diagram showing transition of the electrical connection state of each switch in the high-speed readout mode according to the first embodiment.
Figure 3C:
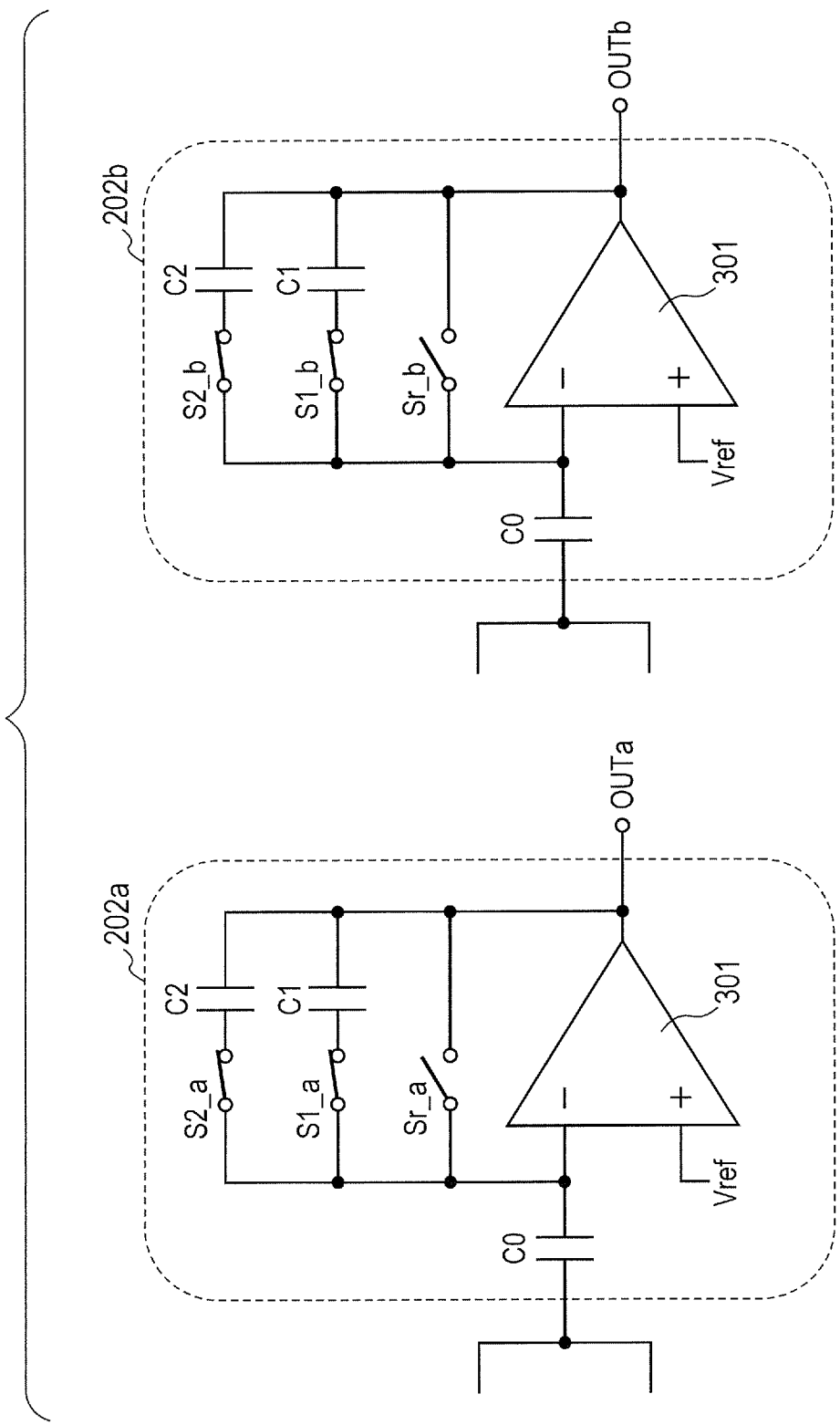
FIG. 3C is a diagram showing the capacitor connection states of the column amplifier circuits in the high-speed readout mode according to the first embodiment.

FIG. 3A is a timing chart in the high-speed readout mode. FIG. 3B shows the electrical connection states between the vertical signal lines and the connection switches during each timing period. FIG. 3C shows the electrical connection state of each switch for setting the gain of each of the column amplifier circuits 202a and 202b.

A vertical pulse PV is supplied to the vertical scanning circuit 102, and the row selection switches SEL[1] to SEL[n] are tuned on for every two rows in synchronism with the vertical pulse PV. In the high-speed readout mode, the row selection switches SEL[1] and SEL[2] are ON during a period from time t0 to time t1, thereby selecting the pixels 101 on the first and second rows, and reading out pixel signals. Similarly, the row selection switches SEL[3] and SEL[4] are ON during a period from time t1 to time t2, thereby reading out selected pixel signals. The row selection switches SEL[5] and SEL[6] are ON during a period from time t2 to t3, thereby reading out selected pixel signals. Although not shown, the above operation is repeated for the number 2n of rows arranged in the pixel unit 10 (that is, n times). In the high-speed readout mode, the switches 201a_odd and 201b_even are always ON. Therefore, the column amplifier circuit 202a amplifies each pixel signal on each odd row electrically connected to the vertical signal line 103_odd. The column amplifier circuit 202b amplifies each pixel signal on each even row electrically connected to the vertical signal line 103_even. The switches S1_a, S2_a, S1_b, and S2_b of the column amplifier circuits 202a and 202b of this embodiment are turned on, and the gains of the column amplifier circuits 202a and 202b are equal to each other, that is, C0/(C1+C2). As described above, in the high-speed readout mode, the number of rows simultaneously selected is two, and the column amplifier circuits 202a and 202b read out odd rows and even rows, respectively. It is thus possible to accelerate the readout by simultaneously reading out pixel signal data of two rows.

Figure 4B:
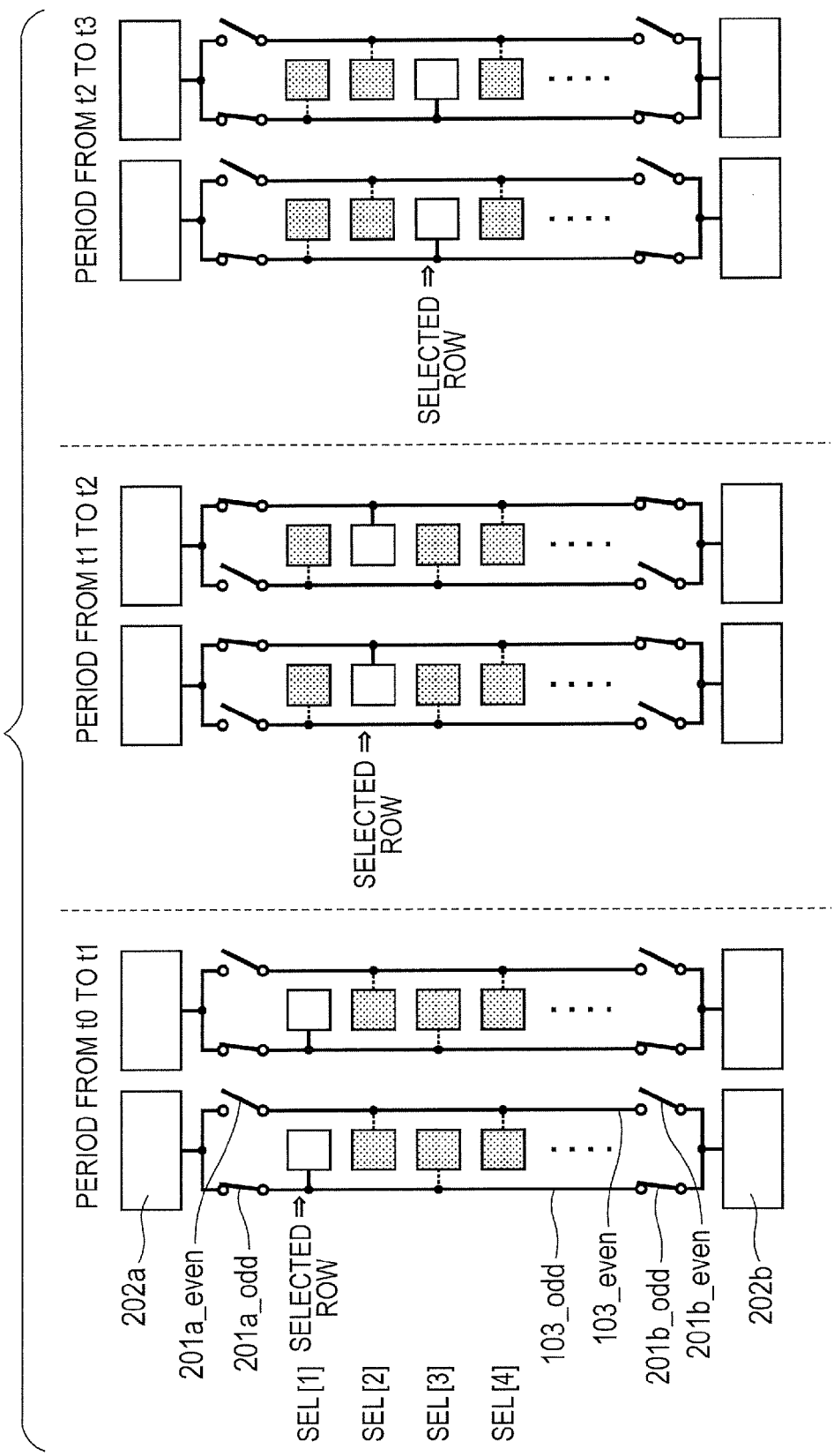
FIG. 4B is a diagram showing transition of the electrical connection state of each switch in the wide dynamic range mode according to the first embodiment.
Figure 4C:
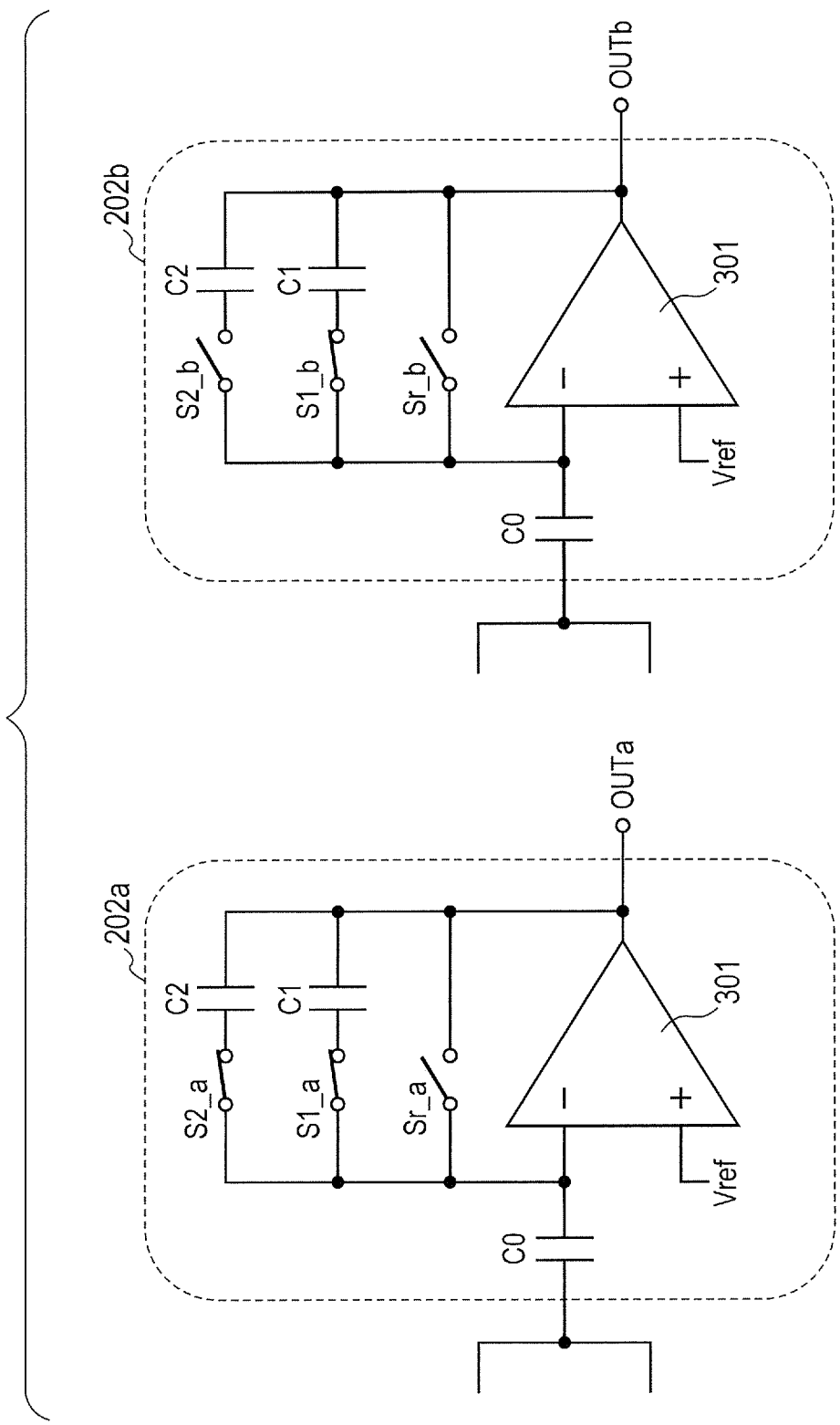
FIG. 4C is a diagram showing the capacitor connection states of the column amplifier circuits in the wide dynamic range mode according to the first embodiment.

FIG. 4A is a timing chart in the wide dynamic range mode. FIG. 4B shows the electrical connection states of the connection switches of the vertical signal lines during each timing period. FIG. 4C shows the electrical connection state of each switch for setting the gains of the column amplifier circuits 202a and 202b. The wide dynamic range mode in this example indicates a driving method of simultaneously reading out the pixel signal of one pixel by a plurality of different amplification gains. According to the embodiment, one solid-state imaging apparatus can select one of the high-speed readout mode of simultaneously reading out the signals of pixels on a plurality of rows, and the wide dynamic range mode of reading out the signal of one pixel by a plurality of column circuits.

In the wide dynamic range mode, in synchronism with the vertical pulse PV, the row selection switch SEL[1] is selected during a period from time t0 to t1, the row selection switch SEL[2] is selected during a period from time t1 to t2, and the row selection switch SEL[3] is selected during a period from time t2 to t3. In this way, the pixels are selected for each row. During the period from time t0 to t1, the connection switches 201a_odd and 201b_odd are turned on and the connection switches 201a_even and 201b_even are turned off. The two column amplifier circuits 202a and 202b amplify pixel signals on the selected first row (odd row). During the next period from time t1 to t2, the connection switches 201a odd and 201b_odd are turned off and the connection switches 201a_even and 201b_even are tuned on. This causes the two column amplifier circuits 202a and 202b to amplify pixel signals on the selected second row (even row). Subsequently, during the period from time t2 to t3, the two column amplifier circuits 202a and 202b amplify pixel signals on the selected third row (odd row), similarly to the electrical connection states during the period from time t0 to t1. The operation of reading out the pixels is repeated for the number 2n of rows arranged in the pixel unit 10.

As shown in FIG. 4C, the switches S1_a and S2_a of the column amplifier circuit 202a are turned on, thereby setting the gain of the column amplifier circuit 202a to C0/(C1+C2). Only the switch S1_b of the column amplifier circuit 202b is turned on, thereby setting the gain of the column amplifier circuit 202b to C0/C1. The signals amplified by the different gains are output from the output circuit 108, and undergo wide dynamic range processing by the signal processing unit 109. As the wide dynamic range processing, for example, the processing described in Japanese Patent Application Laid-Open No. 2010-016416 can be used. For example, if the pixel signal is a small signal of a predetermined output level or lower, the signal processing unit 109 uses the pixel signal amplified by the high gain C0/C1 output from the column amplifier circuit 202b for generating image data. The signal processing unit 109 can suppress noise by performing gain processing of multiplying the pixel signal from the column amplifier circuit 202b by 1/(C0/C1).

That is, as for a small pixel signal, the column amplifier circuit 202b amplifies the pixel signal by a gain larger than 1, and the signal processing unit 109 performs gain processing of multiplying the amplified pixel signal by a magnification smaller than 1. This can reduce noise generated in the column amplifier circuit 202b and subsequent units. If the pixel signal is a large signal of an output level exceeding the predetermined level, the signal processing unit 109 generates image data by using intact the signal amplified by the low gain C0/(C1+C2) and output from the column amplifier circuit 202a. For example, assume that the values of the respective capacitors are C0=800 [fF], C1=50 [fF], and C2=750 [fF]. In this case, the gain of the column amplifier circuit 202a is 1 time, and the gain of the column amplifier circuit 202b is 16 times. The column amplifier circuit 202b multiplies not only the pixel signal but also a pixel noise component n by 16 times, and noise N generated in the column amplifier circuit 202b and subsequent units is independent of the gain, and is not amplified. Therefore, by performing gain processing of multiplying the pixel signal output from the column amplifier circuit 202b by 1/16 time, it is possible to obtain the effect of reducing components of the noise N to 1/16 time, that is, the effect of widening the dynamic range for the small signal.

Note that the above-described gain is not limited to 16 times, and an arbitrary gain G can be used. That is, the column amplifier circuit 202b may amplify the pixel signal by the gain G, and the signal processing unit 109 may multiply the pixel signal by 1/G time. Furthermore, the gain processing by the signal processing unit 109 is not limited to 1/G time, and an arbitrary magnification smaller than 1 time may be used.

Second Embodiment

A solid-state imaging apparatus according to the second embodiment will be described with reference to FIGS. 5A, 5B, 5C and 5D. The solid-state imaging apparatus according to the embodiment outputs an analog signal, and also performs interlaced scanning. The circuit arrangement of the solid-state imaging apparatus and a driving method in the high-speed readout mode according to the second embodiment can be same as those in the first embodiment. Accordingly, only a driving method in the wide dynamic range mode, which is different from that in the first embodiment, will be explained.

Figure 5C:
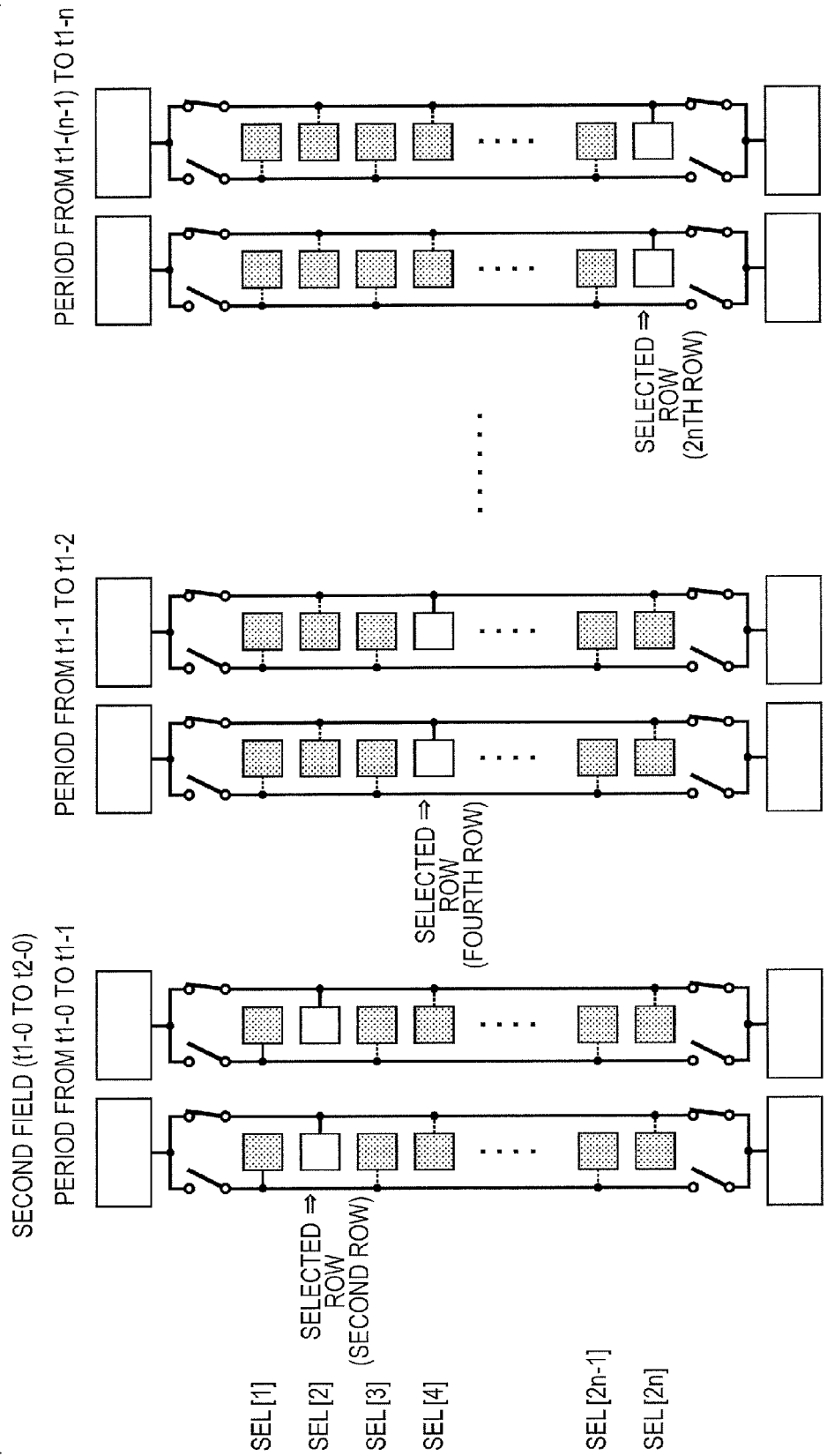
FIG. 5C is a diagram showing transition of the electrical connection state of each switch in the wide dynamic range mode according to the second embodiment.
Figure 5D:
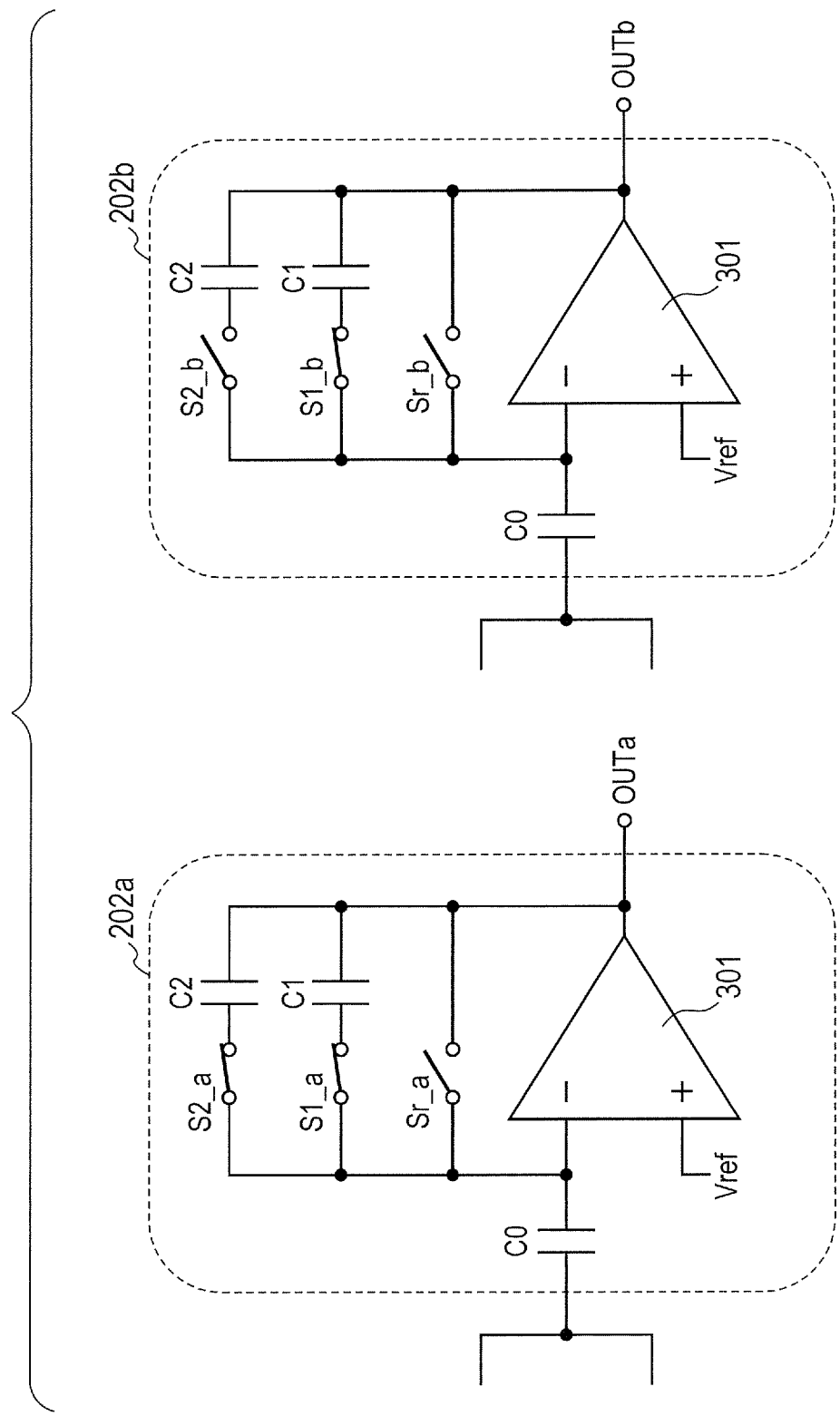
FIG. 5D is a diagram showing the capacitor connection states of column amplifier circuits in the wide dynamic range mode according to the second embodiment.

FIG. 5A is a timing chart in the wide dynamic range mode according to the second embodiment. FIGS. 5B and 5C each show transition of the electrical connection states of the connection switches of vertical signal lines. FIG. 5D shows the electrical connection states of switches for setting the gain of each of column amplifier circuits 202a and 202b. The wide dynamic range mode in this example indicates a driving method of reading out the optical signal of one pixel by a plurality of amplification gains. The electrical connection between the vertical signal line 103 and the column amplifier circuit 202 is switched for each row in the first embodiment. To the contrary, in the second embodiment, the electrical connection is switched at the time of interlaced scanning for each field.

Referring to FIG. 5A, a field switching pulse Pfield is a pulse output for each field. In response to the field switching pulse Pfield, a signal readout operation for the first field starts at time t0-0. This sets a vertical pulse PV at high level at time t0-0, t0-1, t0-2, . . . , t0-n, thereby causing the ON state of each of row selection switches SEL[1] to SEL[n] to transit.

The number of rows simultaneously selected is one. Odd fields are sequentially selected, like the first field for which the operation starts at time t0-0 and the third field for which the operation starts at time t2-0. In the odd fields, the row selection switches SEL[1] (first row), SEL[3] (third row), . . . , SEL[2n−1] ((2n−1)th row), that is, the odd rows are sequentially selected. Even fields are sequentially selected, like the second field for which the operation starts at time t1-0 and the fourth field for which the operation starts at time t3-0. In the even fields, the row selection switches SEL[2]

(second row), SEL[4] (fourth row), ..., SEL[2n] ((2n)th row), that is, the even rows are sequentially selected to read out pixel signals.

When an odd field is selected, connection switches 201a_odd and 201b_odd of the vertical signal lines are turned on and connection switches 201a_even and 201b_even are turned off. This causes the two column amplifier circuits 202a and 202b to amplify pixel signals on the selected odd row. When an even row is selected, the connection switches 201a_odd and 201b_odd are turned off and the connection switches 201a_even and 201b_even are turned on, thereby causing the two column amplifier circuits 202a and 202b to amplify pixel signals on the selected even row. At this time, the amplification gains of the column amplifier circuits 202a and 202b are as shown in FIG. 5D. That is, in the column amplifier circuit 202a, switches S1_a and S2_a are turned on and the gain is set to C0/(C1+C2). In the column amplifier circuit 202b, only a switch S1_b is turned on and the gain is set to C0/C1. Signals amplified by the different gains are output from the output circuit 108, and then undergo wide dynamic range processing by a signal processing unit 109. Furthermore, the signal processing unit 109 synthesizes the output signals of the first field and those of the second field to generate image data of one frame.

In this embodiment, it is also possible to obtain the same effects as those in the first embodiment. In the wide dynamic range mode, it is possible to improve the S/N ratio of a small signal and enlarge the wide dynamic range by simultaneously reading out the pixel signal of one pixel by a plurality of different amplification gains. When the pixel signal is a small signal of the predetermined output level or lower, it is amplified by the high gain C0/C1, and then undergoes gain processing of performing multiplication by 1/(C0/C1). When the pixel signal is a large signal of an output level exceeding the predetermined one, the signal processing unit 109 forms image data by using intact the signal amplified by the low gain C0/(C1+C2) and output from the column amplifier circuit 202a. The column amplifier circuit 202b amplifies not only the pixel signal but also a pixel noise component n but noise N generated in the column amplifier circuit 202b and subsequent units is not amplified. In the wide dynamic range mode, therefore, it is possible to obtain the effect of widening the dynamic range of a small signal. On the other hand, in the high-speed readout mode, it is possible to increase the readout speed by simultaneously reading out pixel signals of two rows using the same gain C0/(C1+C2).

Third Embodiment

A solid-state imaging apparatus according to the third embodiment will be described with reference to FIGS. 6 and 7. In the first and second embodiments, the signal processing unit 109 performs analog/digital conversion of pixel signals. To the contrary, a solid-state imaging apparatus 1 according to this embodiment can convert pixel signals into digital signals by column A/D conversion units 601a and 601b. In this embodiment, a driving mode switching method and a driving method are the same as those described in the first and second embodiments. Components different from the first and second embodiments will be mainly described and a description of the driving mode switching method and the driving method will be omitted.

Figure 6:
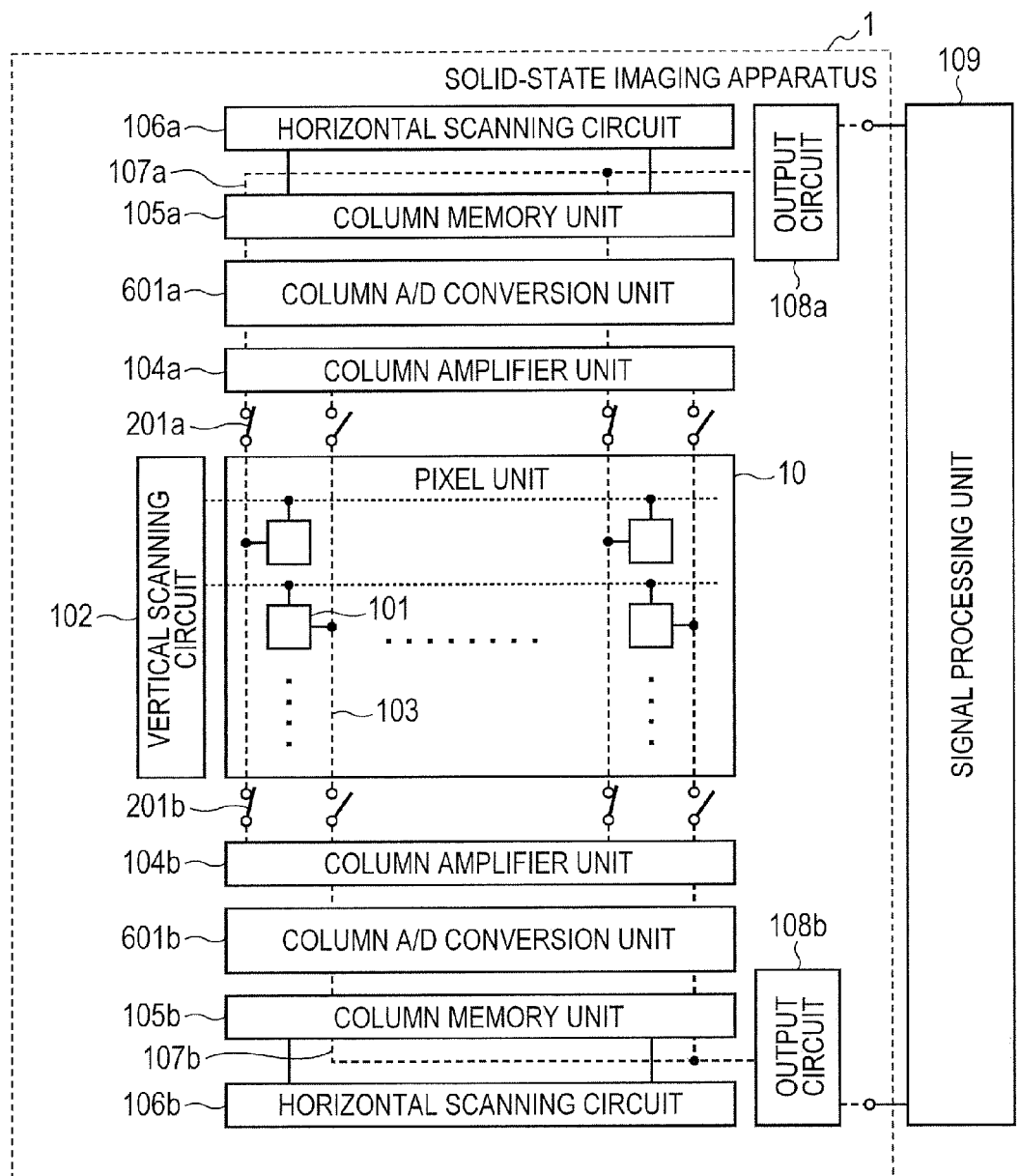
FIG. 6 is a schematic view showing a solid-state imaging apparatus as a whole according to the third or fifth embodiment.

FIG. 6 is a schematic view showing the solid-state imaging apparatus 1 as a whole according to the third embodiment. The solid-state imaging apparatus 1 includes a pixel unit 10 in which pixels 101 are arranged in a matrix, a vertical scanning circuit 102, and vertical signal lines 103. Furthermore, the solid-state imaging apparatus 1 includes column amplifier units 104a and 104b, the column A/D conversion units 601a and 601b, column memory units 105a and 105b, horizontal scanning circuits 106a and 106b, horizontal signal lines 107a and 107b, and output circuits 108a and 108b.

The arrangement of the pixel unit 10, the vertical scanning circuit 102, the vertical signal lines 103, and the column amplifier units 104a and 104b is the same as those in the first embodiment. The column A/D conversion units 601a and 601b convert pixel signals amplified by the column amplifier units 104a and 104b from analog signals to digital signals, respectively. Each of the column memory units 105a and 105b includes a plurality of column memories for holding the digital pixel signals. The horizontal scanning circuits 106a and 106b electrically connect the column memory units 105a and 105b to the horizontal signal lines 107a and 107b, thereby outputting the digitally converted pixel signals from the output circuits 108a and 108b, respectively. The output signals undergo signal processing such as correction processing by a signal processing unit 109, and the processed signals are saved as image data.

Figure 7:
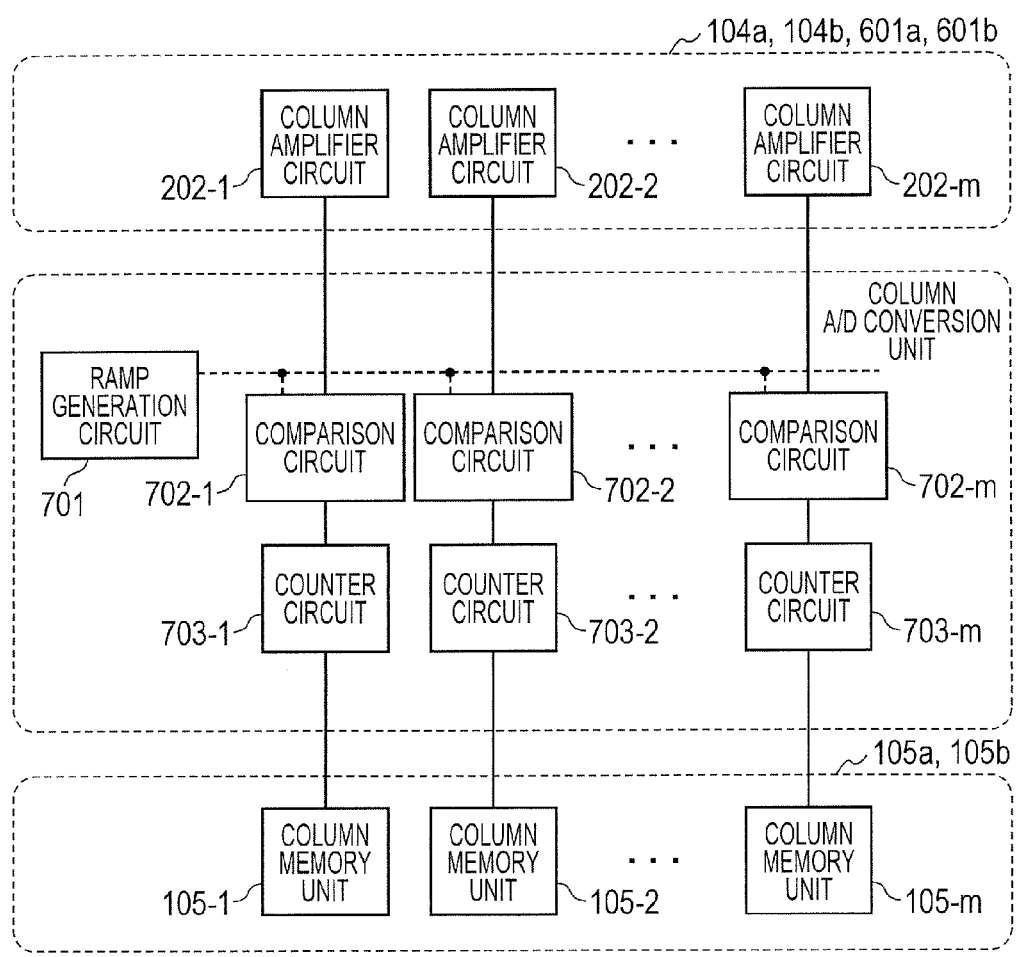
FIG. 7 is a block diagram showing a column A/D conversion unit according to the third embodiment.

FIG. 7 is a block diagram showing the column A/D conversion units 601a and 601b. Each of the column A/D conversion units 601a and 601b includes a ramp generation circuit 701, n comparison circuits 702-1 to 702-n, and n counter circuits 703-1 to 703-n, and digitally converts pixel signals from column amplifier circuits 202. Each comparison circuit 702 compares the amplitude of the pixel signal input from the corresponding column amplifier circuit 202 with that of a ramp signal generated by the ramp generation circuit 701, and outputs an inverted signal as a comparison result. Each counter circuit 703 counts a counter clock from when the ramp signal rises until the output signal of the corresponding comparison circuit 702 is inverted, and outputs a counting result to a corresponding one of the column memory units 105a and 105b as digital conversion data. Setting the maximum count of the counter circuit 703 to $2^{10}$ makes it possible to perform analog to digital conversion of a pixel signal at 10-bit accuracy. The digital conversion data held in each of the column memory units 105a and 105b is electrically connected to the horizontal signal line 107 by the horizontal scanning circuit 106, and output from the output circuit 108. The output signal undergoes signal processing such as correction processing by the signal processing unit 109, and the processed signal is saved as image data.

In this embodiment, it is also possible to accelerate the readout speed by simultaneously reading out pixel signal data of two rows in the high-speed readout mode, and widen the dynamic range for a small signal in the wide dynamic range mode.

Fourth Embodiment

A solid-state imaging apparatus according to the fourth embodiment will be described with reference to FIGS. 8 to 10. A solid-state imaging apparatus 1 according to this embodiment is different from that of the third embodiment in that no column amplifier units are included. Other components are the same as those in the third embodiment. The arrangement different from the third embodiment will be mainly explained.

Figure 8:
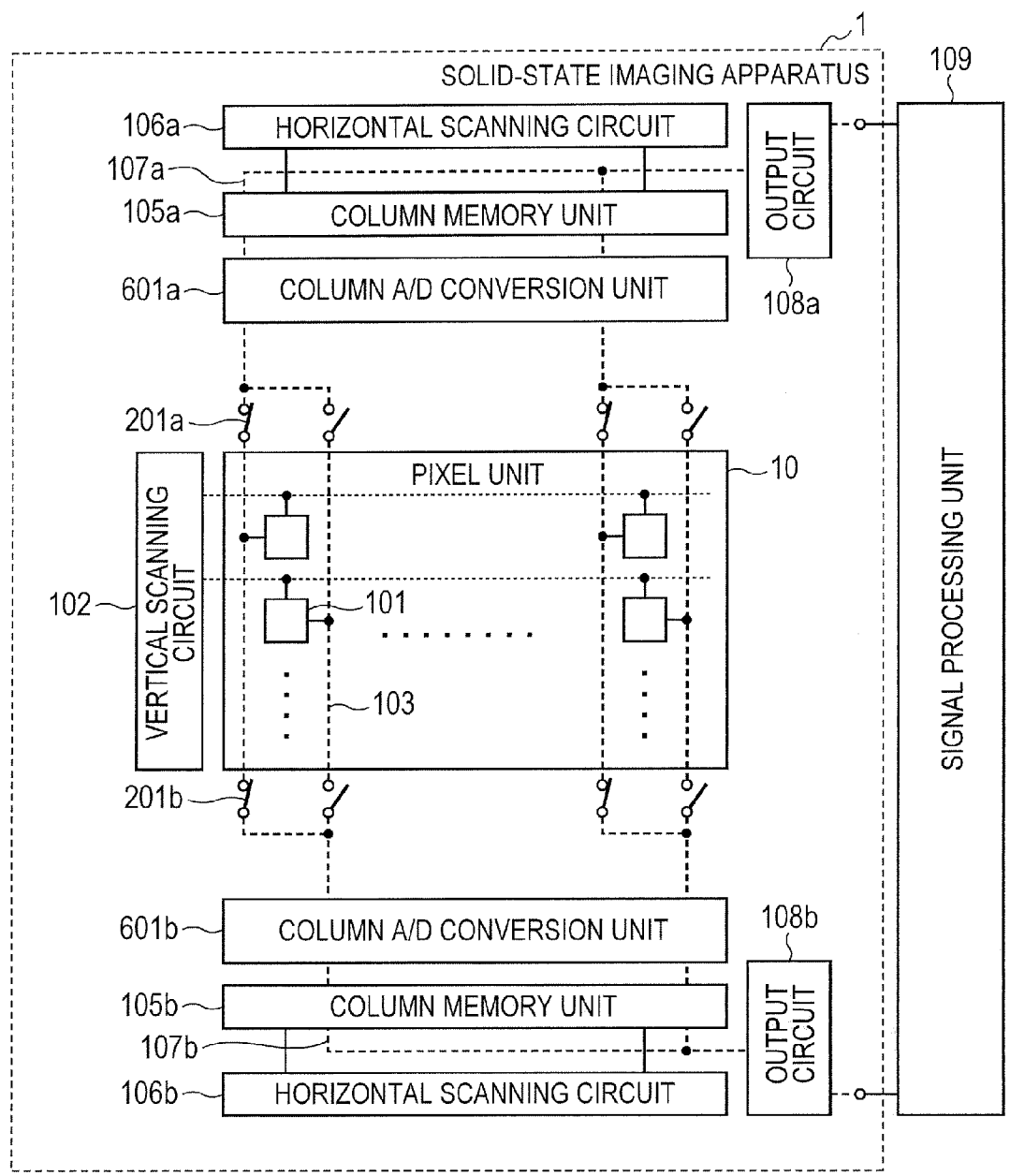
FIG. 8 is a schematic view showing a solid-state imaging apparatus as a whole according to the fourth embodiment.

FIG. 8 is a schematic view showing the solid-state imaging apparatus 1 according to the fourth embodiment. The solid-state imaging apparatus 1 includes a pixel unit 10 in which pixels 101 are two-dimensionally arranged in a matrix, a vertical scanning circuit 102, and vertical signal lines 103. Furthermore, the solid-state imaging apparatus 1 includes column A/D conversion units 601a and 601b, column memory units 105a and 105b, horizontal scanning circuits 106a and 106b, horizontal signal lines 107a and 107b, and output circuits 108a and 108b.

Each vertical signal line 103 is electrically connected to one of the column A/D conversion units 601 via a connection switch 201. The column A/D conversion unit 601 converts an analog pixel signal into a digital signal.

Figure 9:
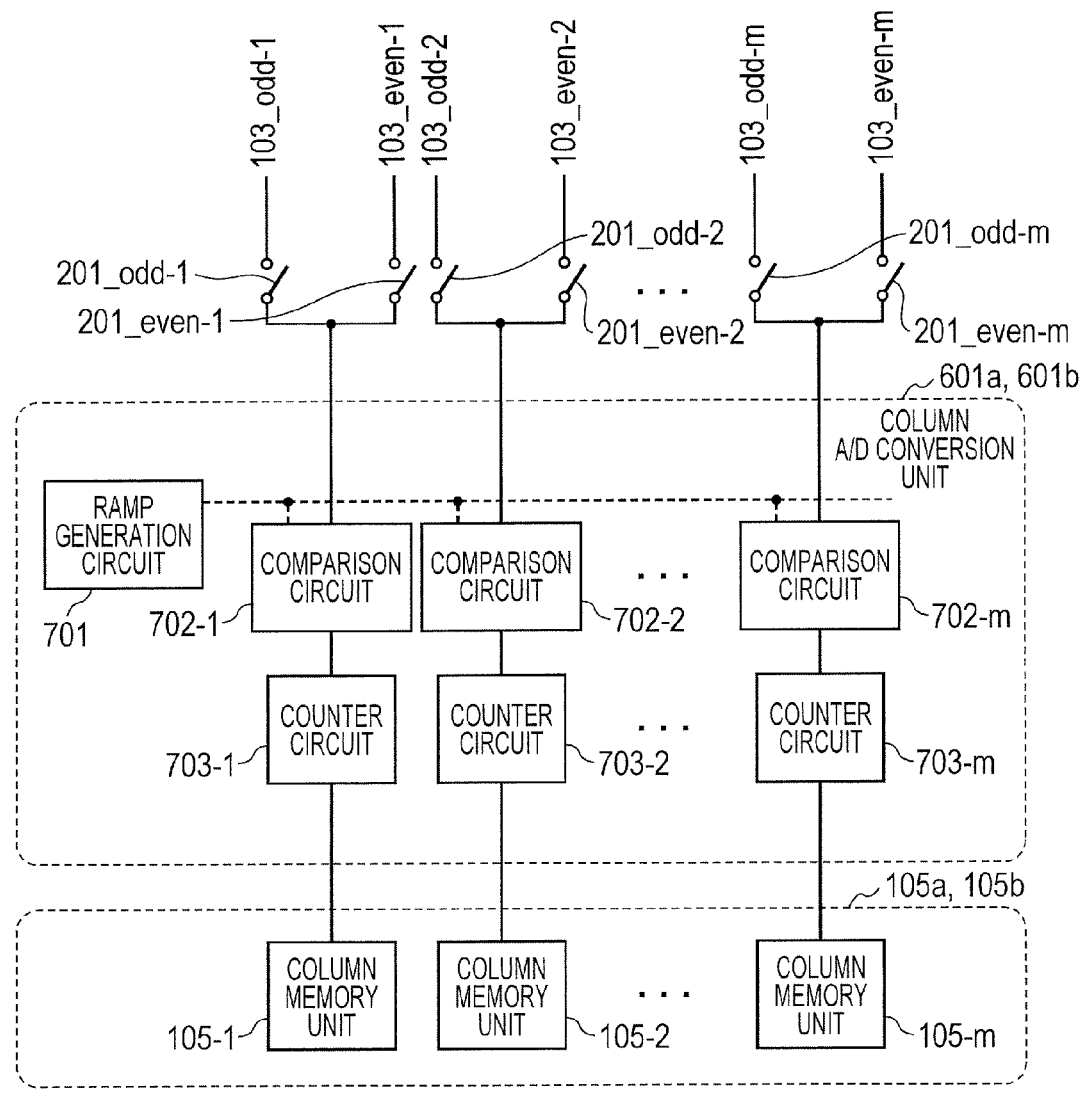
FIG. 9 is a block diagram showing a column A/D conversion unit according to the fourth embodiment.

FIG. 9 is a circuit block diagram showing the column A/D conversion unit 601 according to the fourth embodiment. The column A/D conversion unit 601 includes a ramp generation circuit 701, n comparison circuits 702-1 to 702-n, and n counter circuits 703-1 to 703-n. Each comparison circuit 702 compares the amplitude of a signal input from the vertical signal line 103 with that of a ramp signal generated by the ramp generation circuit 701, and outputs an inverted signal as a comparison result. Each counter circuit 703 counts a counter clock from when the ramp signal rises until the output signal of the comparison circuit 702 is inverted, and outputs a counting result to one of the column memory units 105a and 105b as digital conversion data. The ramp generation circuit 701 according to the fourth embodiment includes a plurality of slopes of the ramp signal, that is, a plurality of rates of change of a reference signal with time, and can arbitrarily set the rate of change.

Figure 10:
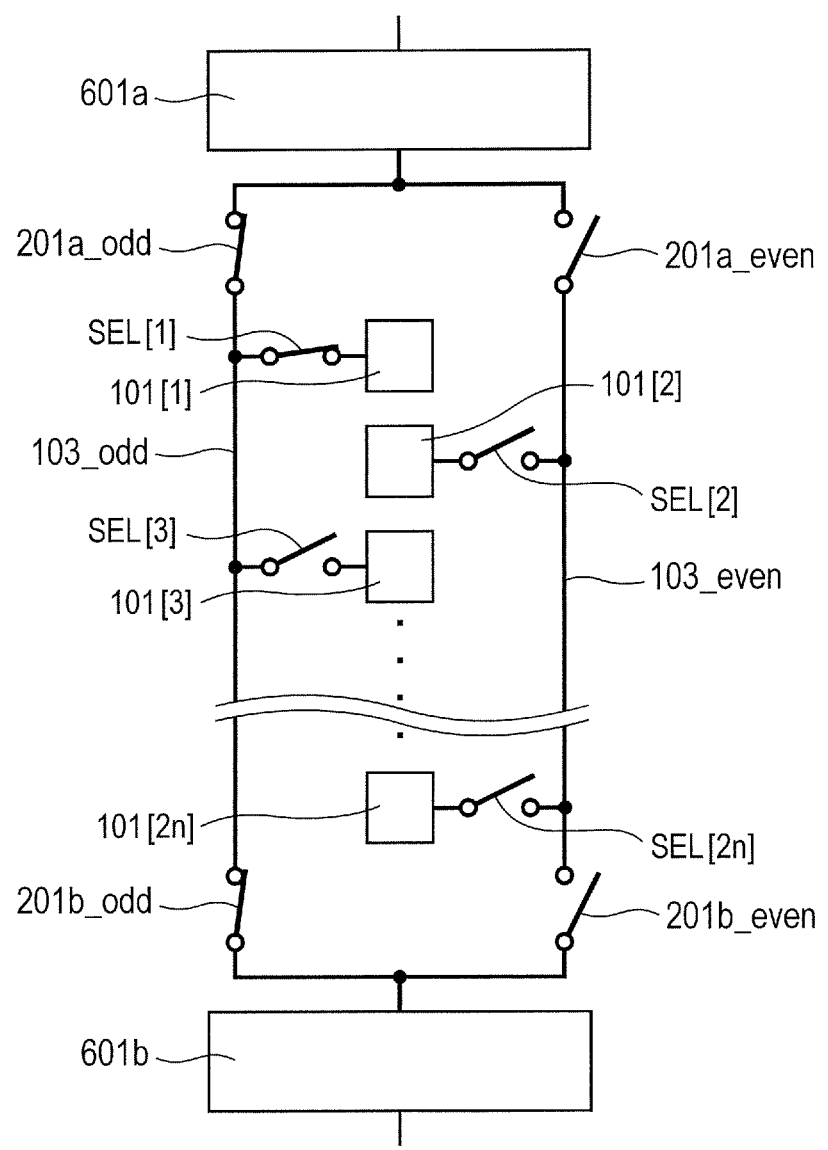
FIG. 10 is a view showing a pixel unit and a signal readout circuit for one column of the solid-state imaging apparatus according to the fourth embodiment.

FIG. 10 shows the arrangement of the pixels 101, the vertical signal lines 103, and the column A/D conversion units 601 for one column according to the fourth embodiment. One end of a vertical signal line 103_odd is electrically connected to the column A/D conversion unit 601a via a connection switch 201a odd, and the other end of the vertical signal line 103_odd is electrically connected to the column A/D conversion unit 601b via a connection switch 201b odd. Similarly, one end of a vertical signal line 103_even is electrically connected to the column A/D conversion unit 601a via a connection switch 201a even, and the other end of the vertical signal line 103_even is electrically connected to the column A/D conversion unit 601b via a connection switch 201b even. Row selection switches SEL[2n−1] of odd rows electrically connect the pixels 101 of the odd rows to the vertical signal line 103_odd, and row selection switches SEL[2n] of even rows electrically connect the pixels 101 of the even rows to the vertical signal line 103_even.

Figure 11:
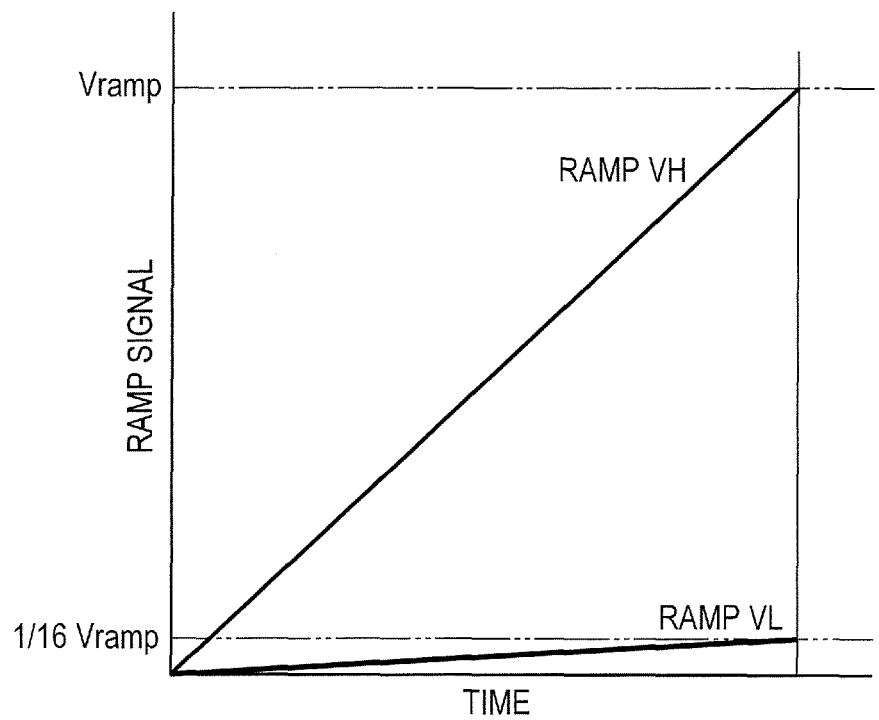
FIG. 11 is a graph for explaining a ramp signal according to the fourth or fifth embodiment.

FIG. 11 is a graph showing ramp signals in the ramp generation circuit 701. As shown in FIG. 11, the two ramp signals are transferred to the column A/D conversion units 601a and 601b. The two column A/D conversion units 601a and 601b can read out the signal of the pixel 101 by different gains. For example, one of a ramp signal VH and a ramp signal VL generated to have a slope which is equal to $\frac{1}{16}$ the slope of the ramp signal VH may be set. In the wide dynamic range mode, the column A/D conversion unit 601a sets the ramp signal VH for a large signal, and the column A/D conversion unit 601b sets the ramp signal VL for a small signal. In this case, a signal A/D-converted by the ramp signal VL is read out at a resolution which is equal to $\frac{1}{16}$ the resolution of the ramp signal VH. The signal processing unit 109 synthesizes the two A/D-converted signals. By adopting the ramp signal VL for a small signal of a predetermined level or lower, and adopting the ramp signal VH for a large signal of a level exceeding the predetermined one, it is possible to acquire image data having a high resolution for a small signal region, that is, a wide dynamic range for the small signal region.

For example, in FIG. 11, if a signal of 1 V is A/D-converted using the ramp signal VH at 10-bit accuracy, the amplitude of a signal of 62.5 mV corresponds to 4 bits, and the resolution of a small signal is not always sufficient. According to this embodiment, by performing analog/digital conversion of a small signal of 62.5 mV or lower using the ramp signal VL, it is possible to perform analog/digital conversion of the signal of 62.5 mV or lower at 10-bit accuracy. If a pixel signal is at 62.5 mV or lower, four redundant bits are added to the upper side of A/D-converted 10-bit data D0 to D9. If the pixel signal is at an output level exceeding the 62.5 mV, the A/D-converted 10-bit data D0 to D9 may be shifted by four bits. With this processing, it is possible to obtain 14-bit digital conversion data. As described in the third embodiment, quantization noise for a small signal is reduced, and thus it is possible to widen the dynamic range.

Furthermore, in the high-speed readout mode, the two column A/D conversion units 601a and 601b can read out pixels on two rows at high speed by using the same ramp signal VH or VL.

Although no column amplifier units 104 are provided in this embodiment, the column A/D conversion units 601a and 601b can perform analog/digital conversion using different ramp signals. If the slopes of the ramp signals are different from each other, the correspondence between the amplitude of a pixel signal and digital conversion data also changes. Therefore, the column A/D conversion units 601a and 601b can practically change the amplification gains of the pixel signals, and functions as digital amplifier circuits. The column A/D conversion units 601a and 601b can serve as column circuits described in the appended claims.

Fifth Embodiment

The arrangement of a solid-state imaging apparatus according to the fifth embodiment is the same as in the third embodiment except for the arrangement of an A/D conversion unit. A driving mode switching method and a driving method according to this embodiment are the same as in the first and second embodiments, and the difference from the first to fourth embodiments will be mainly explained.

Figure 12:
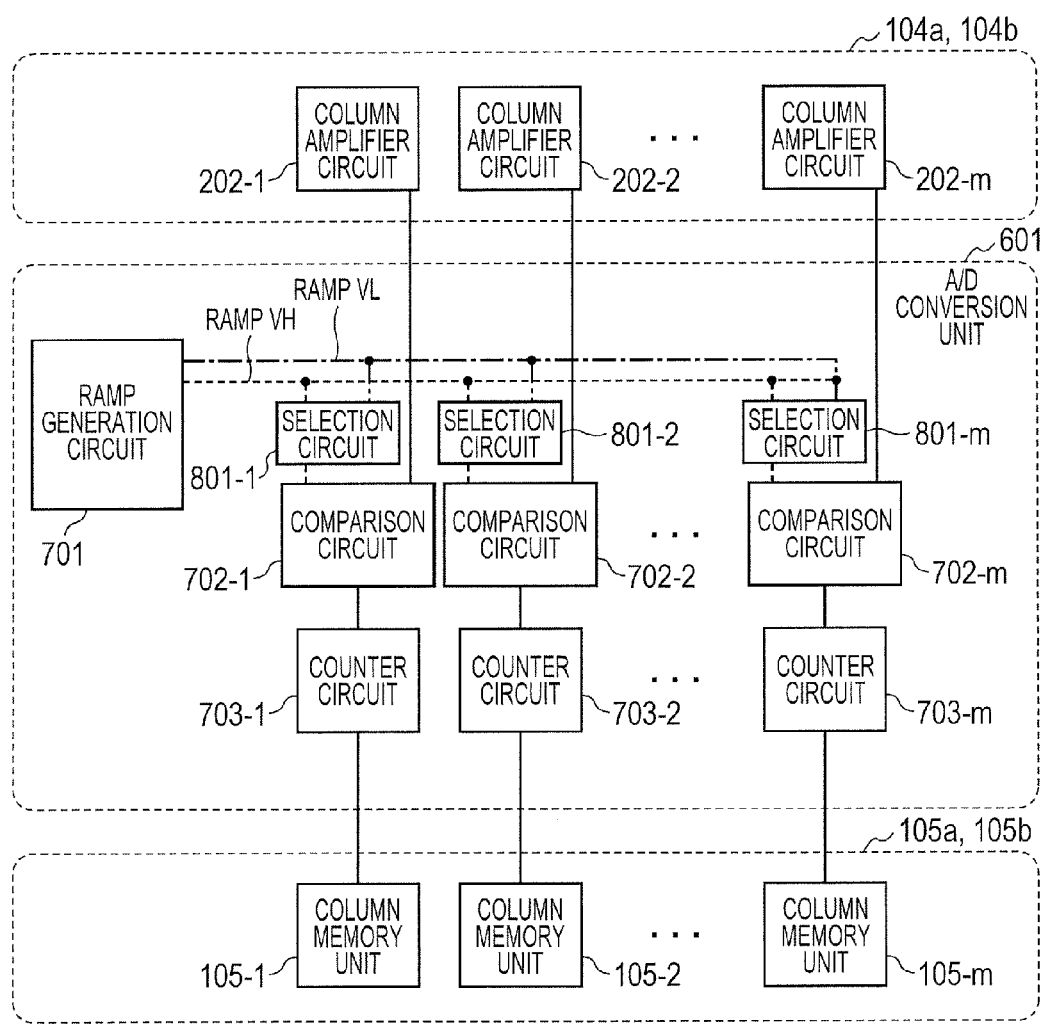
FIG. 12 is a block diagram showing a column A/D conversion unit according to the fifth embodiment.

FIG. 12 is a block diagram showing the arrangement of a column A/D conversion unit 601 according to the fifth embodiment. The column A/D conversion unit 601 is configured to perform analog/digital conversion of a pixel signal amplified by a column amplifier unit 104, and output the A/D-converted pixel signal to a column memory unit 105a or 105b. The column A/D conversion unit 601 includes a ramp generation circuit 701, n selection circuits 801-1 to 801-n, n comparison circuits 702-1 to 702-n, and n counter circuits 703-1 to 703-n. The ramp generation circuit 701 according to this embodiment can output two ramp signals VH and VL, and the selection circuit 801 is configured to select one of the two ramp signals VH and VL.

The column A/D conversion unit 601 determines whether the amplitude of a pixel signal output from a column amplifier circuit 202 is larger than that of a comparison reference signal set in consideration of the S/N ratio of the pixel signal, selects a ramp signal to be compared with the pixel signal in accordance with the determination result, and performs comparison processing. As described above, the ramp generation circuit 701 simultaneously outputs the two ramp signals VH and VL, and sets the ratio between the slopes of the ramp signals VH and VL, that is, an increase in ramp signal with time to 16, as shown in FIG. 11. The comparison circuit 702 compares the amplitude of the input signal with that of the selected one of the ramp signals VH and VL generated by the ramp generation circuit 701, and outputs an inverted signal as a comparison result. The counter circuit 703 counts a counter clock from when the ramp signal rises until the output signal is inverted, and outputs a counting result to the column memory unit 105 as digital conversion data. The digital conversion data held in the column memory unit 105 is electrically connected to a horizontal signal line 107 by a horizontal scanning circuit 106, and output from an output circuit 108. The output signal undergoes signal processing such as correction processing by a signal processing unit 109, and is saved as image data.

In the solid-state imaging apparatus 1 according to this embodiment, one comparison circuit 702 compares the pixel signal with the ramp signal according to the amplitude of the pixel signal, and thus it is possible to acquire digital conversion data of a large number of bits by an analog/digital conversion circuit having a small number of bits. As described in the fourth embodiment, for example, an analog/digital conversion circuit having 10-bit accuracy can practically perform analog/digital conversion at 14-bit accuracy by using the ramp signal VL having a slope which is equal to 1/16 the slope of the ramp signal VH. Therefore, quantization noise for a small signal is reduced, and thus it is possible to widen the dynamic range.

Note that a threshold voltage for switching between the ramp signals VH and VL is not limited to 62.5 mV, and other voltage values may be used. The number of kinds of ramp signals is not limited to two, and three or more ramp signals may be used. That is, N (N≥2) ramp signals may be switched by (N−1) threshold voltages.

Since the solid-state imaging apparatus of this embodiment includes two column amplifier units 104a and 104b, noise generated in the column amplifier units and subsequent units can be reduced, similarly to the first to fourth embodiments. That is, a small pixel signal is amplified by a high gain, and undergoes gain processing of performing multiplication by a magnification smaller than 1, thereby reducing noise generated in the column amplifier unit 104b and subsequent units.

In this embodiment as well, in the high-speed readout mode, it is possible to increase the readout speed by simultaneously reading out the signals of pixels on a plurality of rows. Furthermore, in the wide dynamic range mode, it is possible to widen the dynamic range for a small signal.

Sixth Embodiment

Figure 13:
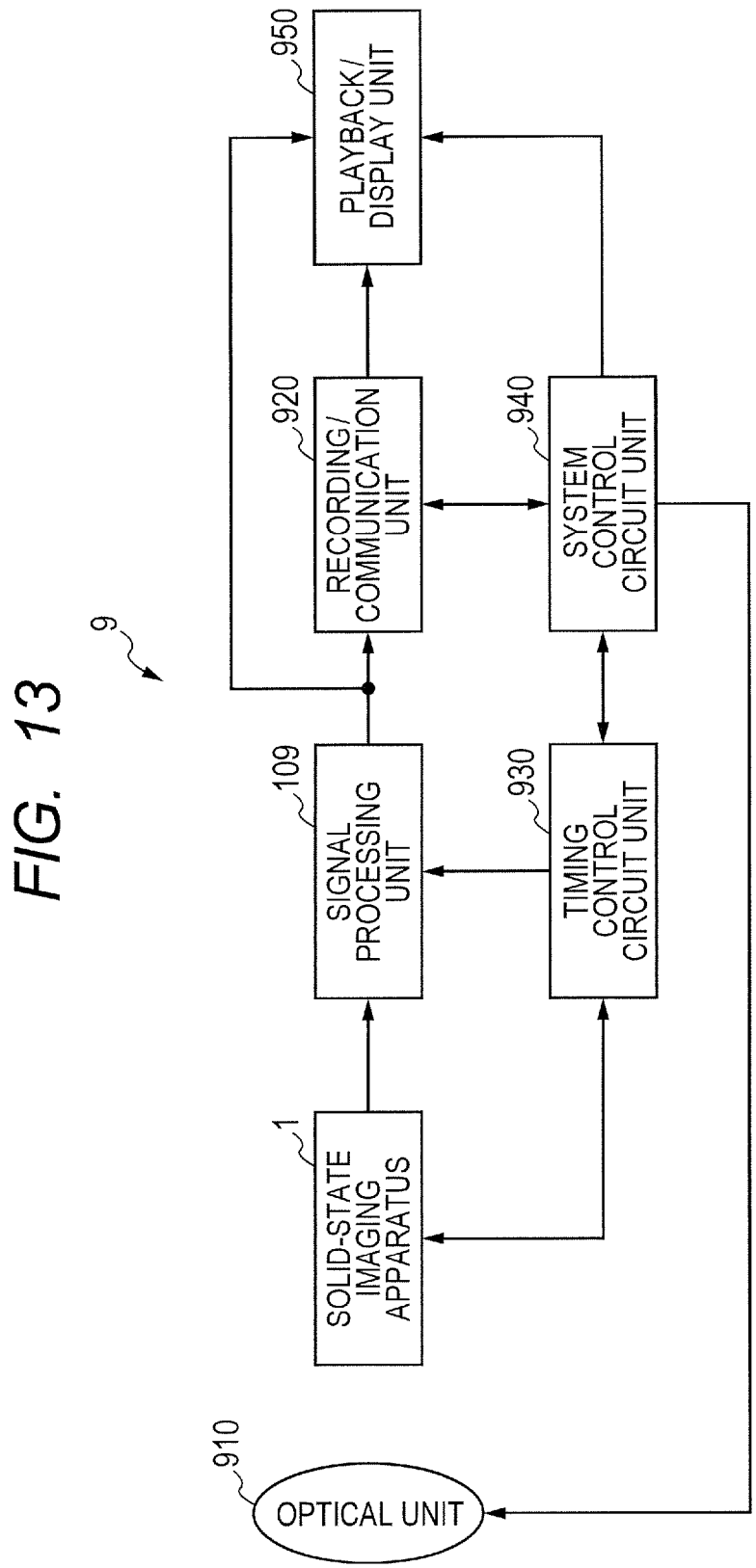
FIG. 13 is a block diagram showing an imaging system according to the sixth embodiment.

FIG. 13 is a block diagram showing an example of the configuration of an imaging system according to the sixth embodiment of the present invention. An imaging system 9 includes, for example, an optical unit 910, a solid-state imaging apparatus 1, a signal processing unit 109, a recording/communication unit 920, a timing control circuit unit 930, a system control circuit unit 940, and a playback/display unit 950. The same solid-state imaging apparatus 1 and signal processing unit 109 as those described in each embodiment described above are used.

The optical unit 910 serving as an optical system such as a lens forms an image of light from an object on a pixel unit 10 (FIG. 1) of the solid-state imaging apparatus 1, thereby forming an image of the object. At a timing based on a signal from the timing control circuit unit 930, the solid-state imaging apparatus 1 outputs a signal corresponding to the image of the light formed on the pixel unit 10. The signal output from the solid-state imaging apparatus 1 is input to the signal processing unit 109, and the signal processing unit 109 performs signal processing such as gain processing for the input signal by a method determined by a program or the like. For example, in the wide dynamic range mode, gain processing of performing multiplication by a magnification smaller than 1 is executed for a small signal amplified by a high gain. A signal obtained by executing the processing by the signal processing unit 109 is sent to the recording/communication unit 920 as image data. The recording/communication unit 920 sends a signal for forming an image to the playback/display unit 950, and causes the playback/display unit 950 to play back/display a moving image or still image. Upon receiving the signal from the signal processing unit 109, the recording/communication unit 920 communicates with the system control circuit unit 940, and also performs an operation of recording the signal for forming an image in a recording medium (not shown).

The system control circuit unit 940 comprehensively controls the operation of the imaging system, and controls driving of the optical unit 910, timing control circuit unit 930, recording/communication unit 920, and playback/display unit 950. The system control circuit unit 940 includes, for example, a storage device (not shown) serving as a recording medium in which programs and the like necessary for controlling the operation of the imaging system are recorded. The system control circuit unit 940 supplies a signal for switching a driving mode to the imaging system in response to a user operation. Practical examples are a change of a row to be read out or reset, a change of the angle of view along with electronic zooming, and a shift of the angle of view along with electronic anti-vibration. The timing control circuit unit 930 controls the driving timings of the solid-state imaging apparatus 1 and signal processing unit 109 under the control of the system control circuit unit 940 serving as a control unit.

Other Embodiments

The solid-state imaging apparatus according to each of the first to sixth embodiments has been described above. The present invention, however, is not limited to the above-described embodiments, and changes can be made without departing from the scope and spirit of the present invention. For example, the number of column amplifier units for each pixel column is not limited to two, and an arbitrary number of column amplifier units such as 4, 8, or 16 column amplifier units can be adopted. That is, N (N is an integer of 2 or more) vertical signal lines and N column amplifier units electrically connected to the N signal lines may be provided for each pixel column. In the high-speed readout mode, a higher-speed readout operation is possible when the N column amplifier units simultaneously read out pixels on N rows. In the wide dynamic range mode, when the N column amplifier units having different gains read out the pixel signal of one pixel, amplification may be performed by a gain corresponding to the level of the pixel signal. Although the practical arrangement of each pixel has not been explained in detail, an active pixel sensor for amplifying a signal in a pixel can be preferably used.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-273334, filed on Dec. 27, 2013, which is hereby incorporated by reference herein in its entirety.

What is claimed is:

1. A solid-state imaging apparatus comprising:
a pixel region having a plurality of pixels arranged in a matrix including a plurality of columns of the pixels, the plurality of pixels being configured to generate signals by photoelectric conversion;
a plurality of signal lines provided for each column of the pixels, the plurality of signal lines including a first signal line and a second signal line both connected to the pixels of one of the plurality of columns; and
a plurality of column circuits provided for each of the signal lines, the plurality of column circuits including a first column circuit and a second column circuit provided for the one of the plurality of columns, wherein
the first and second column circuits are separately arranged in upper and lower positions with respect to the pixel region,
the solid-state imaging apparatus is configured to perform one of a first readout operation of simultaneously processing the signals of the pixels on a plurality of rows by connecting the plurality of column circuits to the plurality of signal lines respectively and a second readout operation of simultaneously processing the signal of the same pixel by different gains by connecting one of the plurality of signal lines to the plurality of column circuits,
first, second, third and fourth switches are provided for the one of the plurality of columns,
the first switch connects the first signal line and the first column circuit,
the second switch connects the first signal line and the second column circuit,
the third switch connects the second signal line and the first column circuit,
the fourth switch connects the second signal line and the second column circuit,
the first and fourth switches are turned on and the second and third switches are turned off when the solid-state imaging apparatus performs the first readout operation, and
the first and second switches are turned on and the third and fourth switches are turned off when the solid-state imaging apparatus performs the second readout operation.

2. An apparatus according to claim 1, wherein each of the column circuits includes an analog amplifier circuit configured to amplify the signal of the pixel.

3. An apparatus according to claim 1, wherein each of the column circuits includes an analog/digital conversion circuit configured to digitally convert the signal of the pixel.

4. An apparatus according to claim 3, wherein the plurality of analog/digital conversion circuits provided in correspondence with the same signal line digitally convert the same pixel signal by different ramp signals.

5. An apparatus according to claim 4, wherein each of the column circuits comprises:
a ramp generation circuit configured to generate a ramp signal which changes with time to be used as at least one of the different ramp signals;
a comparison circuit configured to compare the ramp signal with the signal of the pixel; and
a counter circuit configured to output, as digital conversion data, a counting result from when the ramp signal rises until a comparison result of the comparison circuit is inverted, wherein
a rate of change of the ramp signal with time is set according to an amplitude of the signal of the pixel.

6. An apparatus according to claim 1, wherein in the second readout operation, the plurality of column circuits amplify the signal of the same pixel by different gains, and outputs the amplified signals for processing of widening a dynamic range.

7. An apparatus according to claim 1, wherein in the first readout operation, the plurality of column circuits amplify the signals of the pixels on the plurality of rows by the same gain.

8. An imaging system comprising:
a solid-state imaging apparatus and a signal processing unit configured to process a signal from the solid-state imaging apparatus, the solid-state imaging apparatus comprising:
a pixel region having a plurality of pixels arranged in a matrix and configured to generate signals by photoelectric conversion;
a plurality of signal lines provided for each column of the pixels; and
a plurality of column circuits provided for each of the signal lines, wherein
the plurality of column circuits are separately arranged in upper and lower positions with respect to the pixel region,
the solid-state imaging apparatus is configured to perform one of a first readout operation of simultaneously processing the signals of the pixels on a plurality of rows by connecting the plurality of column circuits to the plurality of signal lines respectively and a second readout operation of simultaneously processing the signal of the same pixel by different gains by connecting one of the plurality of signal lines to the plurality of column circuits, and
the signal processing unit multiplies, by a magnification smaller than 1, a second signal amplified by a gain larger than that of a first signal, among a plurality of signals amplified by different gains in the second readout operation.

9. A system according to claim 8, wherein each of the column circuits includes an analog amplifier circuit configured to amplify the signal of the pixel.

10. A system according to claim 8, wherein each of the column circuits includes an analog/digital conversion circuit configured to digitally convert the signal of the pixel.

11. A system according to claim 10, wherein the plurality of analog/digital conversion circuits provided in correspondence with the same signal line digitally convert the same pixel signal by different ramp signals.

12. A system according to claim 11, wherein each of the column circuits includes
   a ramp generation circuit configured to generate a ramp signal which changes with time to be used as at least one of the different ramp signals,
   a comparison circuit configured to compare the ramp signal with the signal of the pixel, and
   a counter circuit configured to output, as digital conversion data, a counting result from when the ramp signal rises until a comparison result of the comparison circuit is inverted, wherein
   a rate of change of the ramp signal with time is set according to an amplitude of the signal of the pixel.

13. A system according to claim 8, wherein in the second readout operation, the plurality of column circuits amplify the signal of the same pixel by different gains, and outputs the amplified signals for processing of widening a dynamic range.

14. A system according to claim 8, wherein in the first readout operation, the plurality of column circuits amplify the signals of the pixels on the plurality of rows by the same gain.

15. A system according to claim 8, wherein two switches are provided for each of the signal lines.

16. A driving method for a solid-state imaging apparatus including a pixel region having a plurality of pixels arranged in a matrix including a plurality of columns of the pixels and configured to generate signals by photoelectric conversion, a plurality of signal lines provided for each column of the pixels, the plurality of signal lines including a first signal line and a second signal line both connected to the pixels of one of the plurality of columns, a plurality of column circuits for each of the signal lines, the plurality of column circuits including a first column circuit and a second column circuit provided for the one of the plurality of columns, the first and second columns circuits being separately arranged in upper and lower positions with respect to the pixel region, and
   first, second, third and fourth switches provided for the one of the plurality of columns, the second switch connects the first signal line and the second column circuit, the third switch connects the second signal line and the first column circuit, the fourth switch connects the second signal line and the second column circuit, the method comprising:
switching between a first readout operation of simultaneously processing the signals of the pixels on a plurality of rows by connecting the plurality of column circuits to the plurality of signal lines respectively and a second readout operation of simultaneously processing the signal of the same pixel by different gains by connecting one of the plurality of signal lines to the plurality of column circuits,
turning on the first and fourth switches and turning off the second and third switches when the solid-state imaging apparatus performs the first readout operation, and
turning on the first and second switches and turning off the third and fourth switches when the solid-state imaging apparatus performs the second readout operation.

* * * * *